(12) United States Patent
Yoshida

(10) Patent No.: US 7,716,601 B2
(45) Date of Patent: May 11, 2010

(54) INFORMATION PROCESSING DEVICE, METHOD FOR DISPLAYING ICON, AND STORAGE MEDIUM

(75) Inventor: Mayuko Yoshida, Soraku-Gun (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 403 days.

(21) Appl. No.: 11/656,176

(22) Filed: Jan. 19, 2007

(65) Prior Publication Data

US 2007/0171450 A1 Jul. 26, 2007

(30) Foreign Application Priority Data

Jan. 23, 2006 (JP) ............... 2006-014321

(51) Int. Cl.
*G06F 3/048* (2006.01)
(52) U.S. Cl. .............. 715/821; 715/822; 715/823; 715/838; 715/861
(58) Field of Classification Search .......... 715/838, 715/821, 822, 823, 859, 860, 861
See application file for complete search history.

(56) References Cited

U.S. PATENT DOCUMENTS

| | | | | |
|---|---|---|---|---|
| 4,884,972 A | * | 12/1989 | Gasper | 434/185 |
| 5,479,602 A | * | 12/1995 | Baecker et al. | 715/838 |
| 5,664,216 A | * | 9/1997 | Blumenau | 715/234 |
| 7,239,405 B2 | * | 7/2007 | Yamade et al. | 358/1.15 |
| 7,581,195 B2 | * | 8/2009 | Sciammarella et al. | 715/838 |
| 7,657,846 B2 | * | 2/2010 | Banks et al. | 715/836 |
| 2002/0075319 A1 | * | 6/2002 | Hochmuth | 345/810 |
| 2004/0221322 A1 | * | 11/2004 | Shen et al. | 725/135 |

FOREIGN PATENT DOCUMENTS

| | | |
|---|---|---|
| JP | 2000-020212 | 1/2000 |
| JP | 2005-128744 | 5/2005 |
| JP | 2005-309933 | 11/2005 |
| WO | WO-01/29702 A2 | 4/2001 |

\* cited by examiner

*Primary Examiner*—Steven P Sax
*Assistant Examiner*—Andrey Belousov
(74) *Attorney, Agent, or Firm*—Edwards Angell Palmer & Dodge LLP; David G. Conlin; David A. Tucker

(57) ABSTRACT

A host device includes: a scroll display processing section which moves and serially displays, in a predetermined area of a setting screen, expanded function icons indicating respective plural expanded functions which are available when a printing process is executed; a switching icon determination section which specifies the reference number of the expanded function icon which has reached a display type switching means which is a predetermined position or a position specified by an input by the user; and a display type switching section which switches the display type of the expanded function icon corresponding to the reference number specified by the switching icon determination section. With this, it is possible to provide an information processing device which moves and serially displays plural icons, and to display an eye-friendly setting screen.

13 Claims, 24 Drawing Sheets

Still-image icon having reached predetermined position B is switched to animated icon

FIG. 3

| REFERENCE NUMBERS | NAMES OF EXPANDED FUNCTIONS | EXPANDED FUNCTION ICONS | | DIALOG BOX | SETTING COMPLETED ICONS |
|---|---|---|---|---|---|
| | | STILL-IMAGE ICONS | ANIMATED ICONS | | |
| 1 | BINDING MARGIN | [A] | M1 | W1 | [A] |
| 2 | PUNCH HOLE | [□] | M2 | W2 | [□] |
| 3 | STAPLING | [□] | M3 | W2 | [□] |
| 4 | POSTER PRINTING | [A] | M4 | W3 | [A] |
| 5 | WATERMARK | [ABCDE] | M5 | W4 | [ABCDE] |
| ⋮ | ⋮ | ⋮ | ⋮ | ⋮ | ⋮ |

Still-image icon having reached predetermined position B is switched to animated icon

ENLARGE TO 120%

DOWNSIZE TO 80%

FIG. 24

| REFERENCE NUMBERS | NAMES OF EXPANDED FUNCTIONS | FREQUENCY OF USE IN LAST ONE WEEK |
|---|---|---|
| 5 | WATERMARK | 20 TIMES |
| 9 | BRIGHTNESS AND CONTRAST | 10 TIMES |
| 2 | PUNCH HOLE | TWICE |
| 3 | STAPLING | 5 TIMES |
| 11 | OVERLAY | 3 TIMES |
| ⋮ | ⋮ | ⋮ |

FIG. 25

| REFERENCE NUMBERS | NAMES OF EXPANDED FUNCTIONS | TIME OF USE |
|---|---|---|
| 5 | WATERMARK | 2005.10.01  12:00 |
| 9 | BRIGHTNESS AND CONTRAST | 2005.10.01  12:00 |
| 2 | PUNCH HOLE | 2005.10.01  12:00 |
| 5 | WATERMARK | 2005.09.30  15:00 |
| 2 | PUNCH HOLE | 2005.09.30  15:00 |
| 9 | BRIGHTNESS AND CONTRAST | 2005.09.30  10:00 |
| ⋮ | ⋮ | ⋮ |

INFORMATION PROCESSING DEVICE, METHOD FOR DISPLAYING ICON, AND STORAGE MEDIUM

This Nonprovisional application claims priority under 35 U.S.C. §119(a) on Patent Application No. 2006-014321 filed in Japan on Jan. 23, 2006, the entire contents of which are hereby incorporated by reference.

FIELD OF THE INVENTION

The present invention relates to an information processing device which causes a display device to display a setting screen used for setting conditions of a process in a setting target device, and also relates to a program for operating the information processing device and a storage device storing the program.

BACKGROUND OF THE INVENTION

There have conventionally been printer drivers by which a setting screen for setting printing conditions of a printer is displayed. Using this setting screen, the user can select an appropriate printing function among plural printing functions, and set processing conditions of the selected function.

On account of the versatility of recent printers, the number of the aforesaid printing functions has increased. To allow the user to select an appropriate item among many items, there has been a known technique by which icons indicating the respective items are displayed on a setting screen.

For example, PCT Japanese National Phase Unexamined Patent Publication No. 2003-512676 (published on Apr. 2, 2003) teaches that a collection of images such as icons is continuously scrolled (i.e. images are serially moved so as to be displayed). According to this document, the direction and speed of the scroll are changed and the selected image is enlarged, in response to the user input.

According to the conventional art, however, since the icons are changed in response to the user input, the icons merely move when there is no user input. On this account, the user may consider that he/she is required to check all icons moving on the screen. The visibility is therefore poor.

SUMMARY OF THE INVENTION

The objective of the present invention is to provide an information processing device which moves and serially displays plural icons and displays an eye-friendly setting screen, a program, and a storage medium.

To achieve the objective above, an information processing device of the present invention, which causes a display device to display a setting screen for setting a processing condition of a setting target device, the information processing device, is characterized by comprising: a scroll display processing section for moving and serially displaying, in a predetermined area of the setting screen, respective icons indicating plural functions which are available when the setting target device executes a process; an icon specifying section for specifying, as a specified icon, at least one of the icons having reached a predetermined position or a specified position which is specified by a user, in the predetermined area; and a display type switching section for switching a display type of the specified icon specified by the icon specifying section.

According to this arrangement, the display type switching section switches the display type of the specified icon, when the icon has reached a predetermined position or a specified position which is specified by an input by the user.

The switching of the display type of the specified icon indicates, for example, that the specified icon is switched from a still image to an animated image, or the specified icon, which is an animated image, is played back from the first frame image.

Since the display type of the specified icon having reached the specified position is switched, the specified icon is highlighted for the user. As a result, the specified icon whose display type has been changed is conspicuous for the user, among the icons displayed on the setting screen. The user is not required to simultaneously check plural icons, and hence the visibility is improved.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3 shows an example of a table managed by a content management section of the host device.

FIG. 24 shows an example of a use frequency table.

FIG. 25 shows an example of history information showing the status of use of expanded functions.

DESCRIPTION OF THE EMBODIMENTS

The present invention relates to an information processing device which causes a display device to display a setting screen by which conditions of a process in a setting target device are set. Examples of the functions set by the information processing device of the present invention include a function related to a printing process in a printer, a function related to an information process for various applications (e.g. document processing software and image editing software), and a function related to a control process of a manufacturing device. The following embodiment deals with a device which sets plural functions related to a printing process in a printer. The present invention, however, is not limited to this embodiment.

Embodiment 1

The following will describe an embodiment of the present invention with reference to FIGS. 1-20.

(Overall Structure of Printing System)

Figure 2:
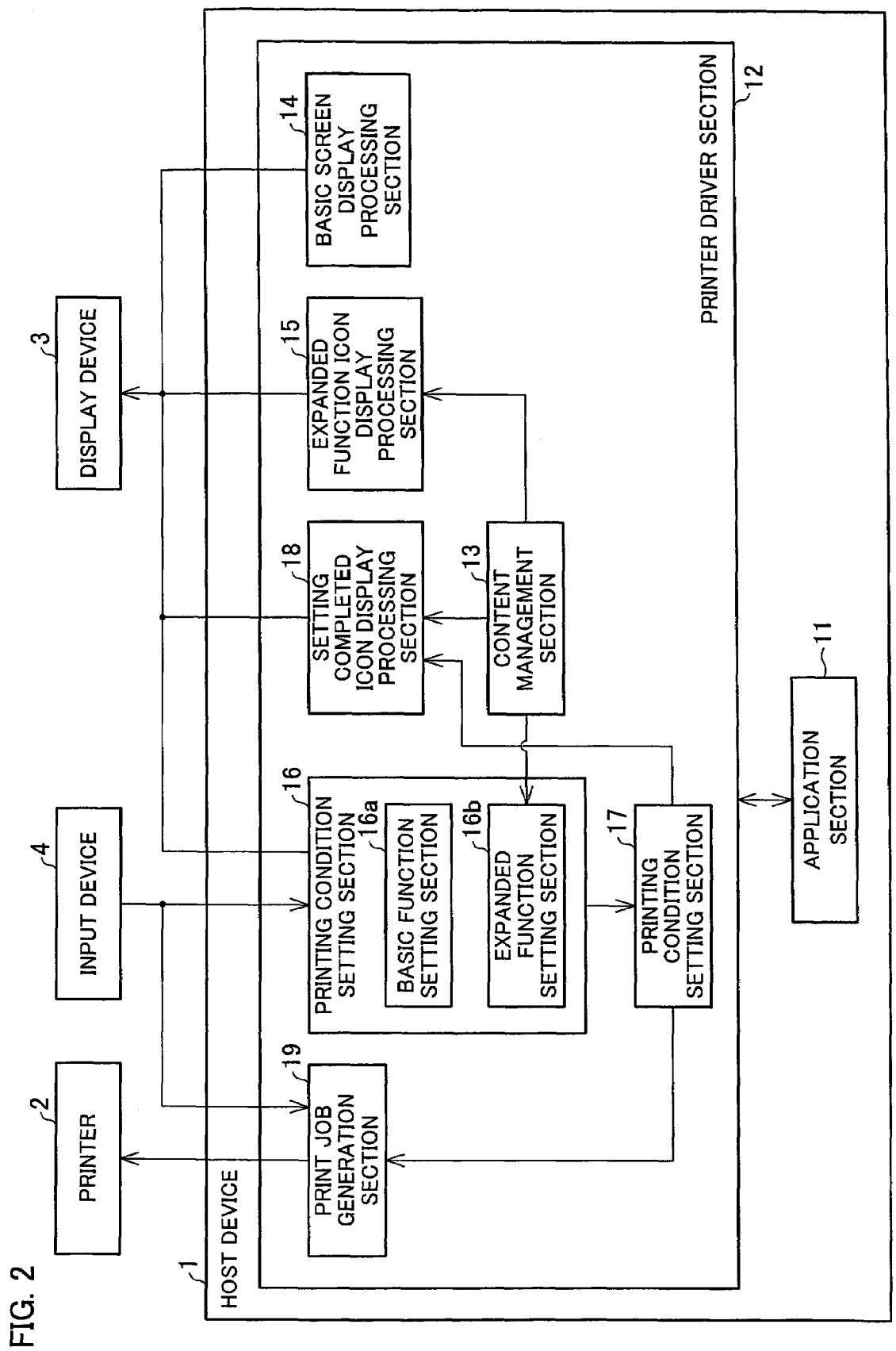
FIG. 2 is a block diagram showing the internal structure of the host device and its peripheral devices of the present invention.

FIG. 2 is a block diagram showing a printing system of the present embodiment. As shown in the figure, the printing system of the present embodiment includes a host device (information processing device) 1, a printer (setting target device) 2, a display device 3, and an input device 4.

The host device 1 converts image data, which has been created using document processing software, image editing software or the like, into printing data based on the printing conditions set by a user input, generates a processing instruction for a printing process performed by a printer 2, and outputs, to the printing 2, a printing job including the generated printing data and processing instruction. The host device 1 is, for example, a personal computer.

The printer 2 forms, on a recording medium such as paper, an image corresponding to the printing job supplied from the host device, and discharges the recording medium. The host device 1 is connected to the printer 2, over a USB cable, communication network, or the like.

The display device 3 is, for example, a liquid crystal display, and displays an image in response to an instruction from the host device 1. Examples of the input device 4 include a mouse, a track ball, a track pad, a tablet, and a keyboard. The input device 3 outputs an instruction of the user to the host device 1.

(Host Device)

As shown in FIG. 2, the host device 1 includes an application section 11 and a printer driver section 12. Also, the host device 1 is provided with an operating system (OS). Through this operating system, data and instructions are exchanged between the blocks.

The application section 11 performs processes corresponding to various applications (e.g. document processing software, spreadsheet software, and image editing software) so as to generate image data. Receiving a setting instruction to set printing conditions from the input device 4, the application 11 activates the printer driver section 12 and causes the same to set the printing conditions, and supplies the generated image data to the printer driver section 12.

The printer driver section 12 is a function block in which an arithmetic unit such as a CPU operates in accordance with a printer driver program in compliance with the printer 2. The printer driver 12 sets the printing conditions when image data supplied from the application section 11 is printed, and generates a printing job corresponding to the printing conditions thus set.

The printer driver 12 causes the display device 3 to display a setting screen for setting the printing conditions, prompts the user to select a printing function and input processing conditions of the selected printing function, and sets the printing functions in accordance with the user input.

Examples of the printing functions are as follows:

number of print copies setting function by which the number of print copies is set;

sheet size setting function by which the size of a sheet on which an image is formed by the printer 2 is determined;

duplex printing function by which single-side printing, duplex printing, saddle stitch printing or the like is set;

N-UP printing function by which plural (N) pages are printed in one sheet;

sheet direction setting function by which the direction of a sheet is set;

fit page function by which the size of a document image is adjusted to fit the size of the sheet;

aspect ratio changing function by which the aspect ration of an image is changed;

poster printing function by which an image for one page is divided into plural images, and those images are printed on a different sheet;

overlay function by which an image is printed on another image;

watermark function by which a watermark such as "Confidential" and "Important" is printed;

edge-to-edge function by which an image is printed so as to entirely cover the maximum printable area;

180-degree turn function by which an image to be printed is turned for 180 degrees;

line width adjusting function by which a line width is adjusted;

punch hole function by which a punch hole is formed around the edge of a printed sheet;

stapling function by which plural printed sheets are stapled;

binding margin function by which a binding margin is formed at the edge;

OHP slip sheet function by which a slip sheet is interposed into printed sheets.

There are two types of printing functions, which are (i) basic functions (the number of print copies function, sheet size setting function, duplex printing function, N-UP printing function, and sheet direction setting function in the present embodiment) which are always used for printing in a particular processing condition and (ii) expanded functions other than those basic functions.

The printing conditions include processing conditions of each basic function and processing conditions of an expanded function selected by the user.

As shown in FIG. 2, the printer driver section 12 includes a content management section 13, a basic screen display processing section 14, an expanded function icon display processing section 15, a printing condition setting section (function setting means) 16, a printing condition storage section 17, a setting completed icon display processing section 18, and a print job generation section (setting target device) 19.

The content management section 13 manages expanded function icons indicating respective expanded functions. As shown in FIG. 3, the content management section 13 manages a table in which, for each expanded function, the following items are associated with one another: (i) a reference number by which the expanded function is identified, (ii) the name of the expanded function, (iii) a still-image expanded function icon (hereinafter, still-image icon) indicating the expanded function, (iv) an animated expanded function icon (hereinafter, animated icon), (v) a dialogue box to which processing conditions of the expanded function are input, and (vi) a setting completed icon indicating that the setting of the expanded function has been completed.

Figure 4:
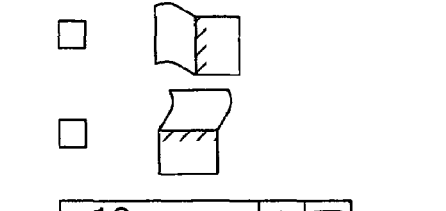
FIG. 4 shows an example of a dialogue box managed by the content management section.
Figure 5:
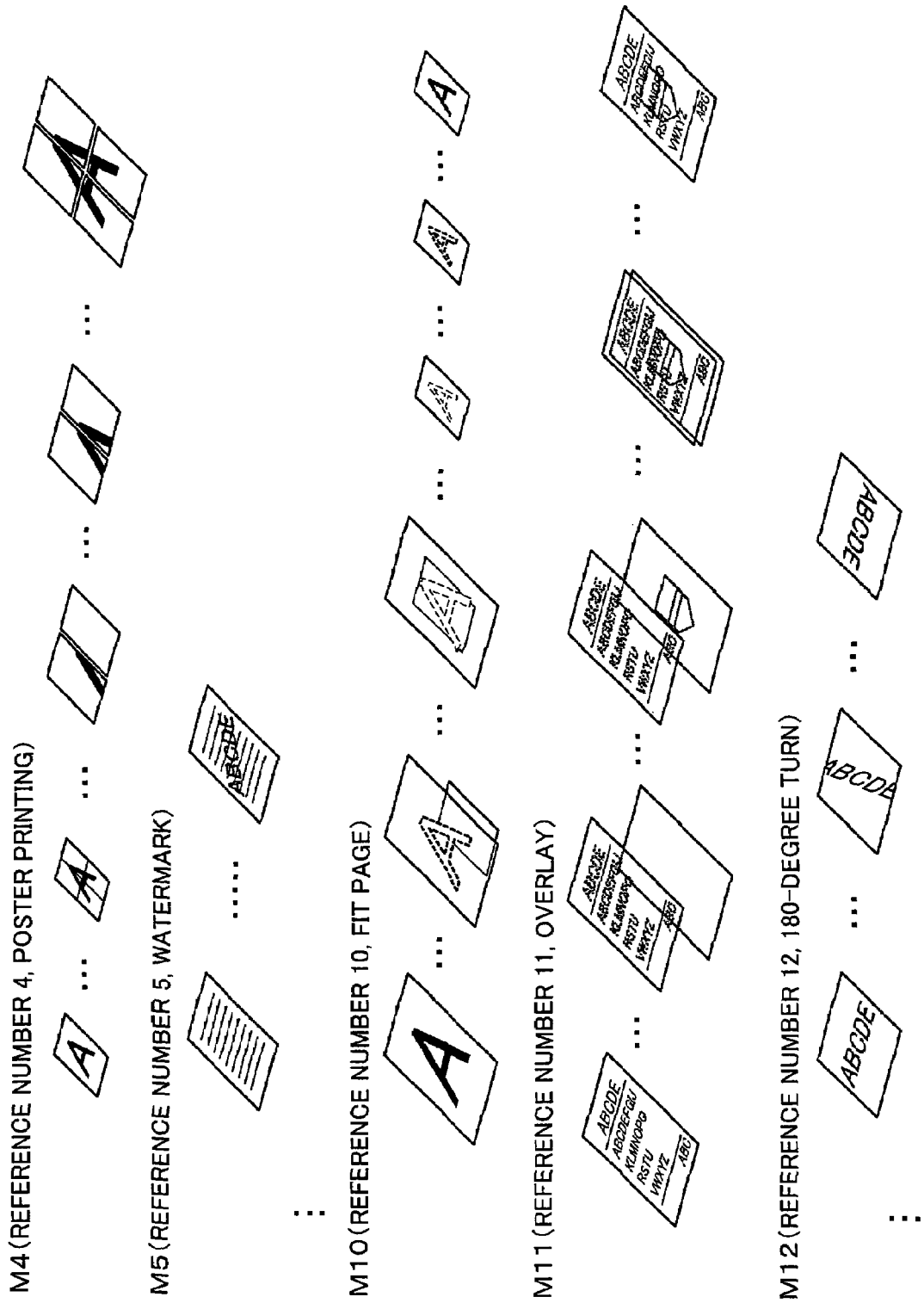
FIG. 5 shows an example of animated icons managed by the content management section.

FIG. 4 shows details of the dialogue boxes W1 and so on, which are shown in FIG. 3. FIG. 5 shows details of the animated icons M1 and so on, which are shown in FIG. 3. As shown in FIG. 5, an animated icon is made up of plural frame images. A set of data (frame image data) representing each frame image has a frame number. The frame images are played back in accordance with the order of the frame numbers.

Figure 6:
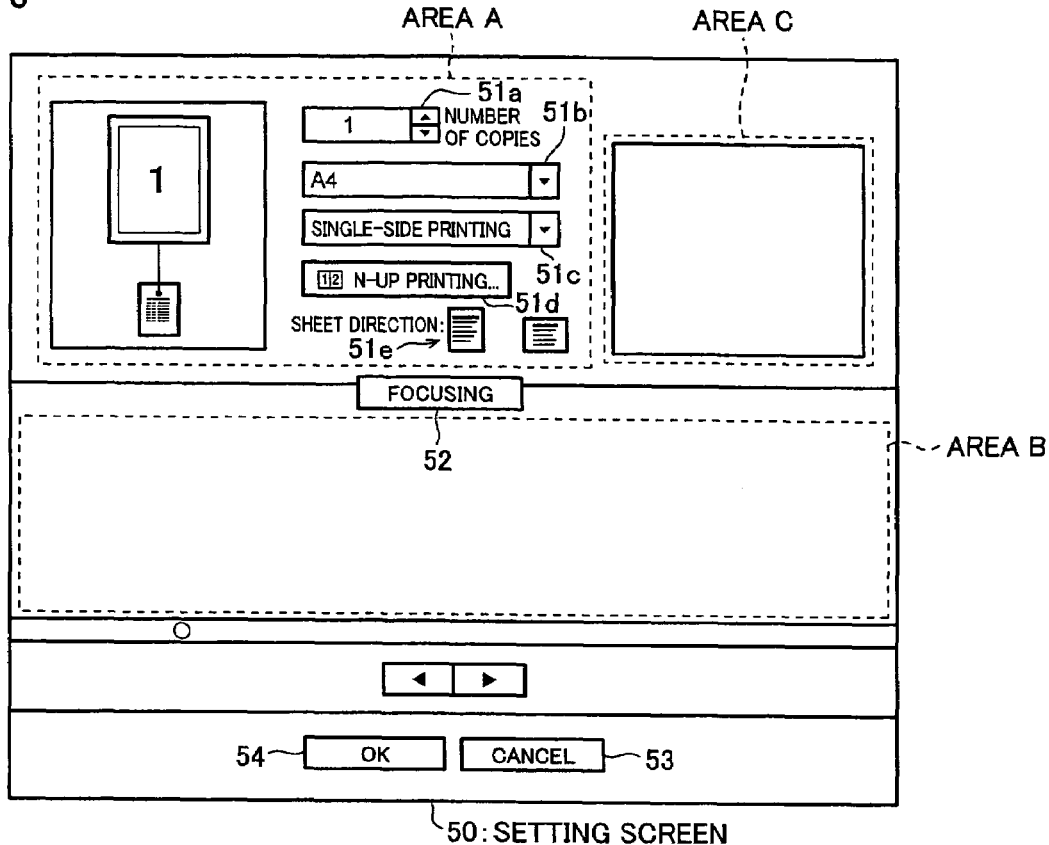
FIG. 6 is an example of a setting screen displayed by a basic screen display processing section of the host device.

As shown in FIG. 6, the basic screen display processing section 14 causes the display device 3 to display a setting screen 50 which shows an area A including basic function input buttons 51a-51e for setting basic functions, an area B where an expanded function icon (still-image icon or animated icon) moves in a predetermined direction (right to left in this case), and an area C where the list of setting completed icons is shown.

The basic screen display processing section 14 displays only frames of the areas B and C. The display processes in the areas are, as described later, carried out by the expanded function icon display processing section 15 and the setting completed icon display processing section 18.

The expanded function icon display processing section 15 reads out an expanded function icon from the content management section 13, and causes the expanded function icon to move in a predetermined direction (right to left in this case) on the area B of the setting screen 50 (see FIG. 6). Details of the expanded function icon display processing section 15 will be given later.

The printing condition setting section 16 includes a basic function setting section 16a for setting processing conditions of a basic function and an expanded function setting section (function setting means) 16b for setting processing conditions of an expanded function.

The basic function setting section 16a sets processing conditions of each basic function, in accordance with inputs to the basic function input buttons 51a-51e (see FIG. 6) displayed in the area A of the setting screen 50. The basic function setting section 16a stores, in the printing condition storage section 17, the processing conditions of the basic function, which have been set.

When an expanded function icon (still-image icon or animated icon) in the setting screen is clicked, the expanded function setting section 16b reads out, from the content management section 13, a dialogue box and a reference number which correspond to the clicked expanded function icon. Also, the expanded function setting section 16b displays the dialogue box on the display device 3 so as to prompt the user to input the processing conditions, and sets the processing conditions in line with the input to the input device 4. For the expanded function which has been set, the expanded function setting section 16b associates the reference number of the expanded function with the processing conditions thus set, and stores them in the printing condition storage section 17.

The printing condition storage section 17 stores the processing conditions set for each printing function. When the host device 1 is activated, the printing condition storage section 17 stores default processing conditions for each basic function. The processing conditions of each basic function, which are stored in the printing condition storage section 17, are updated by the basic function setting section 16a. For the expanded function whose processing conditions have been set by the expanded function setting section 16b, the printing condition storage section 17 stores the reference number and the processing conditions in association with one another.

The setting completed icon display processing section 18 reads out all reference numbers (i.e. reference numbers corresponding to the expanded functions whose processing conditions have been set by the expanded function setting section 16b) stored in the printing condition storage section 17, and also reads out, from the content management section 13, setting completed icons corresponding to the reference numbers thus read out. The setting completed icon display processing section 18 then displays all of the setting completed icons thus read out, on the area C (see FIG. 6) of the setting screen 50.

The print job generation section 19 generates a print job, in response to the input of a print start instruction to the input device 4. More specifically, the print job generation section 19 obtains image data to be printed from the application section 11, and reads out the processing conditions of all printing functions stored in the printing condition storage section 17. Thereafter, the print job generation section 19 converts the image data into print data in accordance with the processing conditions of each printing function thus read out, and also generates a processing instruction to the printer 2. The print job generation section 19 then outputs, to the printer 2, a print job including the generated print data and processing instruction.

(Details of Expanded Function Icon Display Processing Section)

As described above, the expanded function icon display processing section 15 displays an expanded function icon in the area B of the setting screen 50. It is, however, noted that the expanded function icon display processing section 15 of the present embodiment does not merely cause expanded function icons to be scrolled with a single display type. The expanded function icon display processing section 15 changes the display type of an expanded function icon, which has reached a predetermined position, to be different from the display type of other expanded function icons, in order to highlight the icon having reached the predetermined position.

Figure 1:
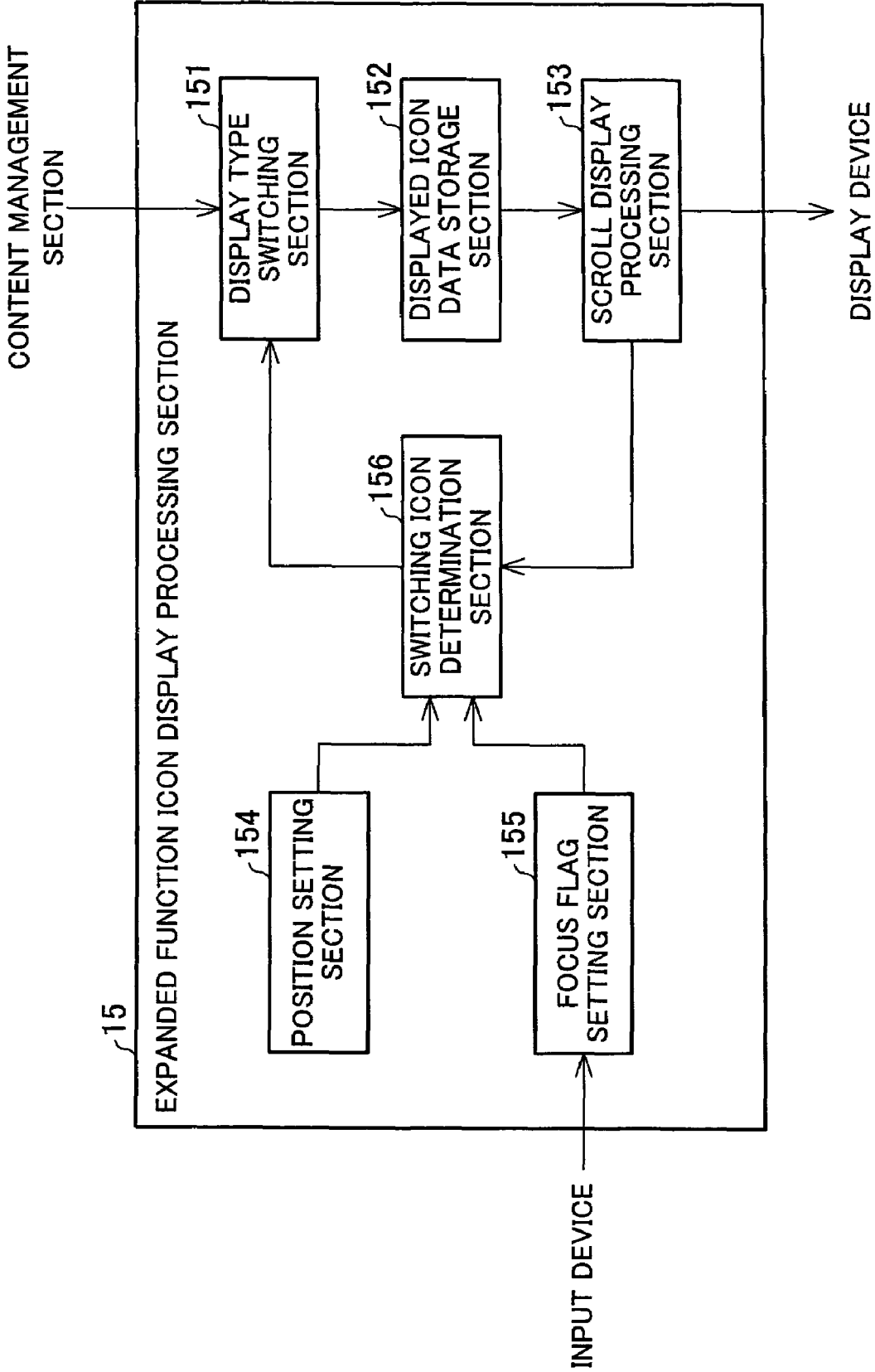
FIG. 1 is a block diagram showing an expanded function icon display processing section of a host device.

FIG. 1 is a block diagram showing the internal structure of the expanded function icon display processing section 15. As shown in FIG. 1, the expanded function icon display processing section 15 includes a display type switching section (display type switching means) 151, the displayed icon data storage section 152, a scroll display processing section (scroll display processing means, display type switching means) 153, a position setting section 154, a focus flag setting section (validation/invalidation switching means) 155, and a switching icon determination section (icon specifying means) 156.

The display type switching section 151 reads out, from the content management section 13, still-image icons corresponding to the respective reference numbers, and stores those still-image icons in association with the respective reference numbers, in the displayed icon data storage section 152.

Receiving a switching instruction (described later) from the switching icon determination section 156, the display type switching section 151 reads out, from the content management section 13, an animated icon corresponding to the reference number added to the switching instruction. The display type switching section 151 rewrites a still-image icon, which is stored in the displayed icon data storage section 152 and corresponds to the reference number, into an animated icon having been read out from the content management section 13.

Receiving a switching cancellation instruction (described later) from the switching icon determination section 156, the display type switching section 151 reads out, from the content management section 13, a still-image icon corresponding to a reference number added to the switching cancellation instruction. The display type switching section 151 then rewrites an animated icon, which is stored in the displayed icon data storage section 152 and corresponds to the reference number, into a still-image icon having been read out from the content management section 13.

The displayed icon data storage section 152 stores the data of an expanded function icon of each reference number, which icon is displayed in the area B (see FIG. 6) by the scroll display processing section 153. As described above, the data stored in the displayed icon data storage section 152 is updated by the display type switching section 151. The displayed icon data storage section 152 stores either a still-image icon or an animated icon, in association with each reference number.

The scroll display processing section 153 reads out expanded function icons from the displayed icon data storage section 152, in accordance with the order of the reference numbers. The scroll display processing section 153 then causes those expanded function icons to move in the area B of the setting screen 50, in a predetermined direction (to the left in this case).

In regard of each of those expanded function icons displayed in the area B, the scroll display processing section 153 sends the positional information to the switching icon determination section 156. In the positional information, the reference number of the expanded function icon is associated with current position coordinates of the icon in the area B.

In case where the expanded function icon stored in the displayed icon data storage section 152 is an animated icon, the scroll display processing section 153 moves the animated icon and at the same time serially plays back the frame images constituting the animated icon, from the frame number 1. Once the playback of the last frame of the animated icon is completed, the scroll display processing section 153 sends, to the switching icon determination section 156, a one-cycle playback completion notification to which the reference number corresponding to the aforesaid animated icon is added.

The scroll display processing section 153 plays back an animated icon, at a predetermined playback speed P0.

The position setting section 154 sets coordinates (display type switching position coordinates) of a position (display type switching position: predetermined position) where the display type of an expanded function icon is switched. The display type switching position set by the position setting section 154 is either a default position or a position determined by an input from the user.

Figure 7:
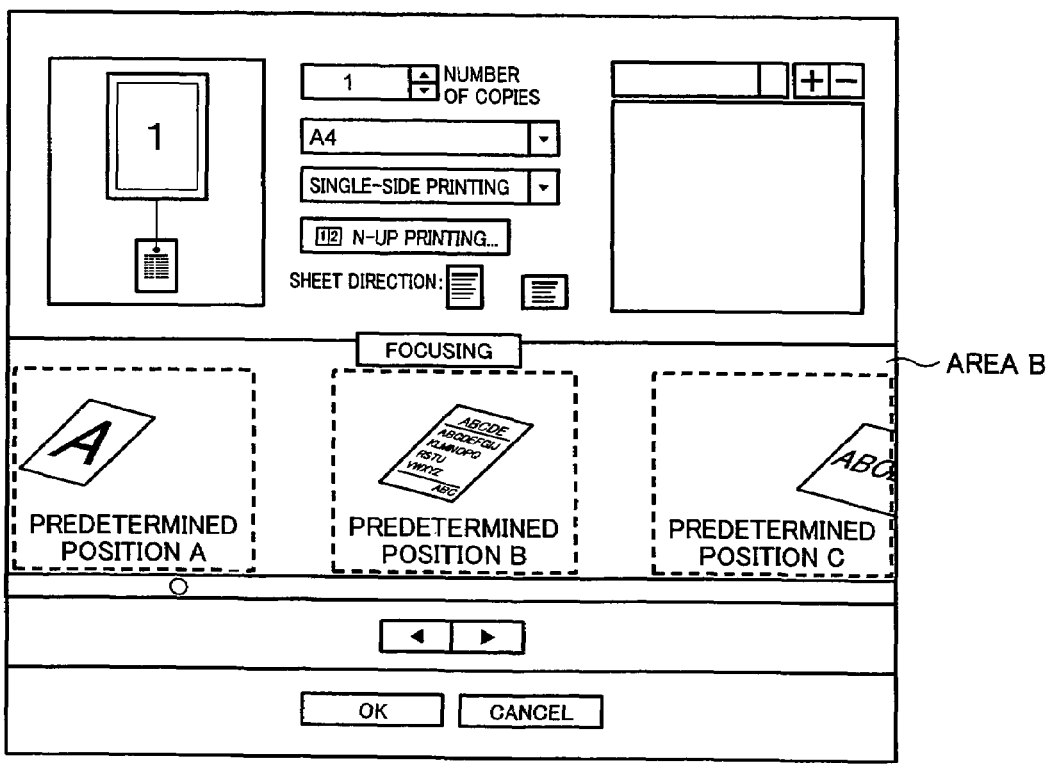
FIG. 7 illustrates a display type switching position.

The display type switching position is, as shown in FIG. 7, the center (predetermined position B), the left edge (predetermined position A), or the right edge (predetermined position C) of the area B, for example. At the predetermined position B, an icon is highlighted at the most viewable position for the user. The predetermined position C is where an icon is newly displayed in the area and starts to move. At this position, an icon which is newly displayed in the area is highlighted. The predetermined position A is where an icon stops the movement and will disappear from the area soon. Highlighting an icon at this position warns the user not to forget to set the processing conditions.

The focus flag setting section 155 manages a focus flag ("1": valid, "0": invalid) which indicates whether the switching process of an expanded function icon having reached the display type switching position is valid or not. The focus flag setting section 155 switches the focus flag, when a focus button displayed in the setting screen 50 is pushed.

The switching icon determination section 156 determines which expanded function is the target to switch the display type (in the present embodiment, a still-image icon is switched to an animated icon), and outputs a switching instruction to which the reference number of that expanded function is added.

The switching icon determination section 156 compares display position coordinates included in positional information supplied from the scroll display processing section 153 with the display type switching position coordinates which have been set by the position setting section 154, when the focus flag managed by the focus flag setting section 155 is "1" (valid). The switching icon determination section 156 then specifies, in the positional information, the reference number corresponding to the display type switching position coordinates, and supplies, to the display type switching section 151, a switching instruction which instructs to switch the display type and includes the specified reference number.

That is to say, the switching icon determination section 156 specifies the reference number of the expanded function icon having reached the display type switching position, and sends, to the display type switching section 151, a switching instruction to which the specified reference number is added.

Receiving the one-cycle playback completion notification from the scroll display processing section 153, the switching icon determination section 156 sends, to the display type switching section 151, a switching cancellation instruction added to the supplied one-cycle playback completion notification.

(Display Process of Expanded Function Icon)

Figure 8:
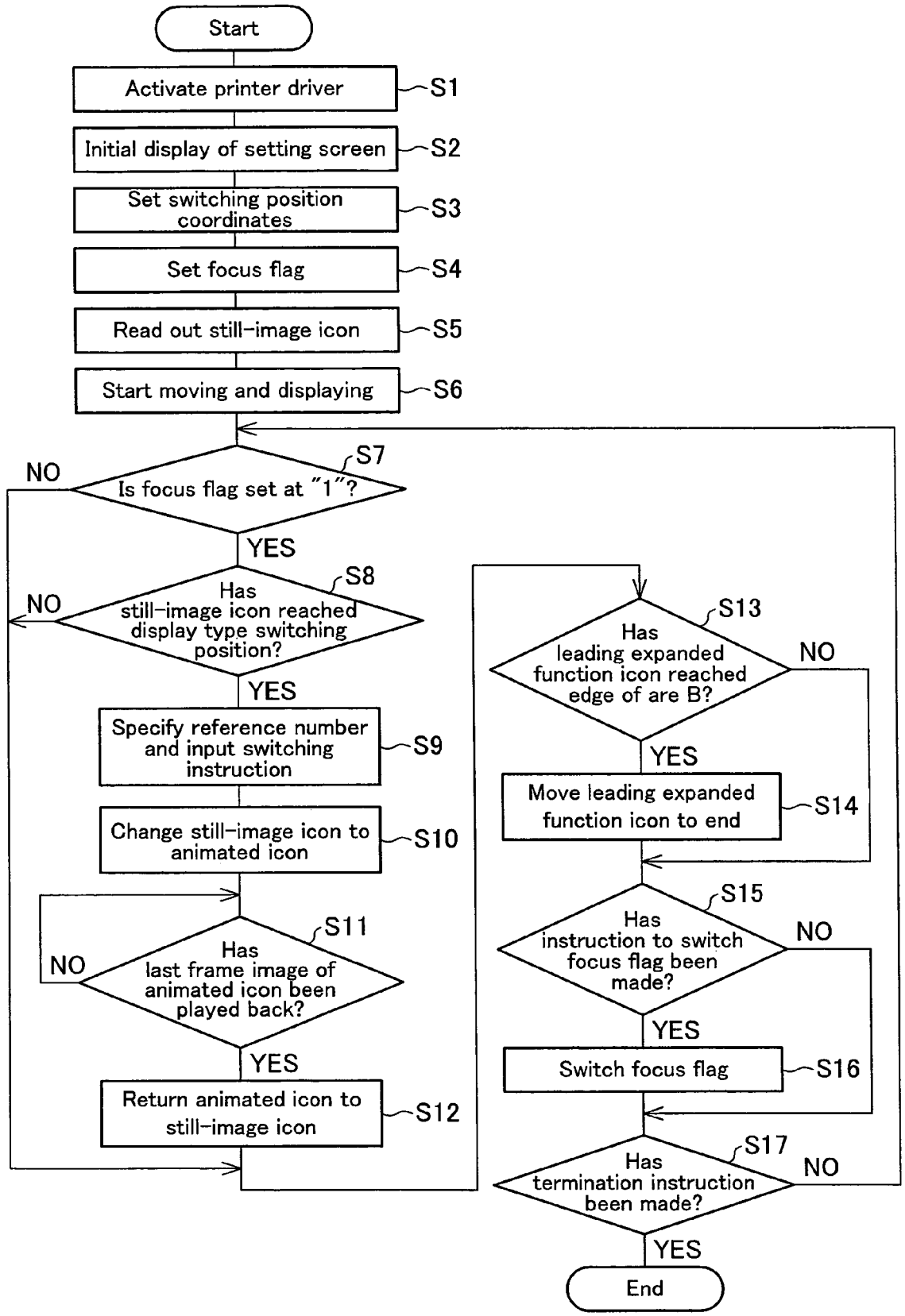
FIG. 8 is a flowchart showing the flow of a display process of an expanded function icon.

The following will describe the flow of a display process for displaying expanded function icons in the expanded function icon display processing section 15, with reference to the flowchart in FIG. 8.

In response to a request from the application section 11, the printer driver section 12 is activated (S1). As the printer drive section 12 is activated, the basic screen display processing section 14 displays, as shown in FIG. 6, a setting screen 50 in default setting, which screen shows an area A including input buttons for the input of processing conditions of basic functions, an area B where an expanded function icon moves, and an area C where a setting completed icon is displayed (S2).

Subsequently, the position setting section 154 sets a default position or position coordinates input by the user, as display type switching position coordinates (S3). In the present case, assume that the coordinates of a predetermined position B (at the center) shown in FIG. 7 is set as the display type switching position coordinates.

The focus flag setting section 155 then sets a focus flag in a default value or a value which has been set since the last display process for displaying expanded function icons was terminated (S4).

Thereafter, the display type switching section 151 reads out, from the content management section 13, still-image icons corresponding to all reference numbers, and stores those icons in the displayed icon data storage section 152 (S5).

Figure 9:
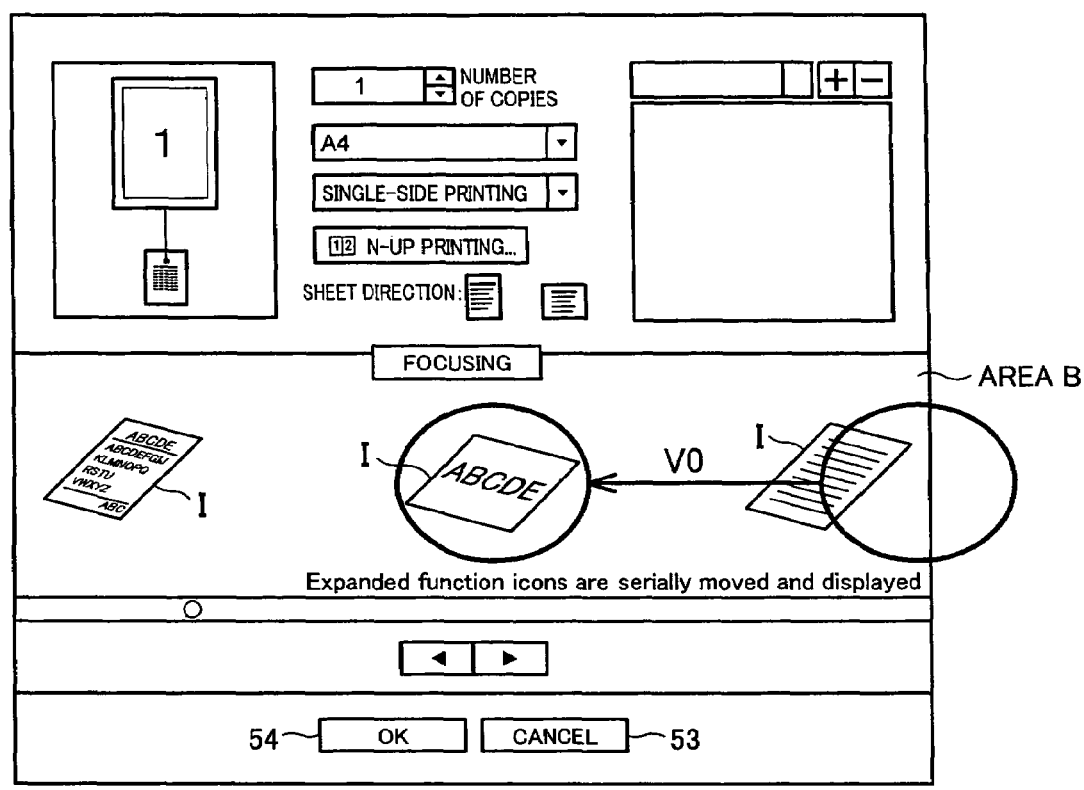
FIG. 9 shows an example of a setting screen on which an expanded function icon is moving.
Figure 12:
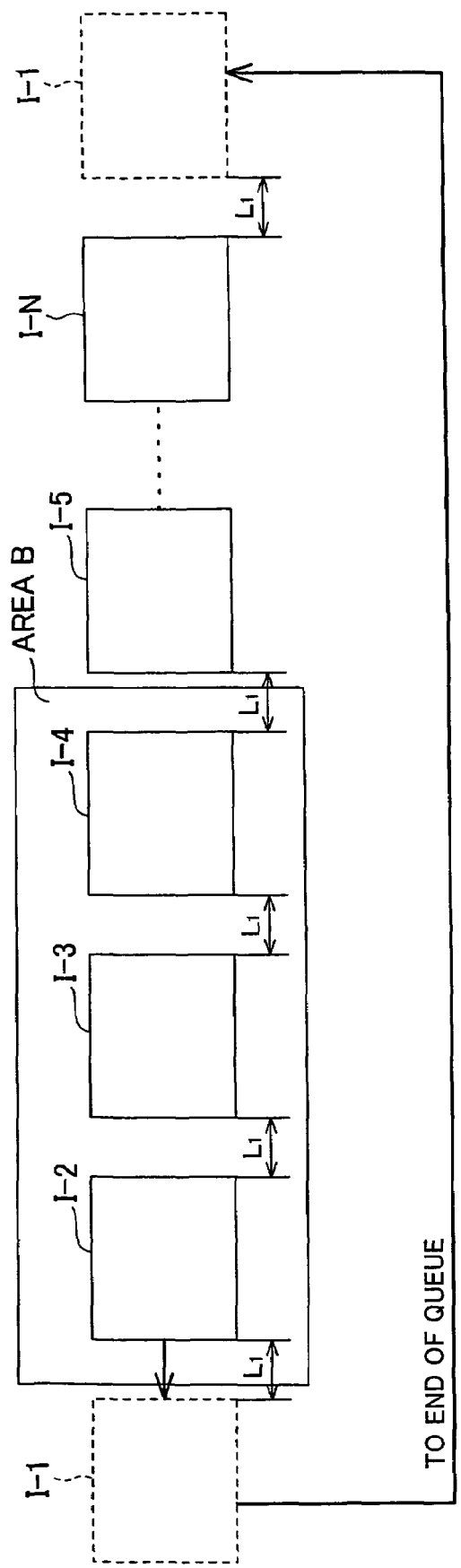
FIG. 12 shows in what manner the expanded function icon is moved.

The scroll display processing section 153 displays, in the area B of the setting screen 50, the still-image icons stored in the displayed icon data storage section 152, in the order of the reference numbers from the right edge, and causes those icons to move toward the left at a predetermined travel speed V0 (S6). FIG. 9 shows an example of a setting screen on which an expanded function icon I (still-image icon in this case) moves. As shown in FIG. 12, the scroll display processing section 153 serially displays expanded function icons (i-n) (n: reference number) with a space L1 being interposed therebetween.

The scroll display processing section 153 outputs, to the switching icon determination section 156, positional information in which, in regard of each still-image icon displayed in the area B, the reference number of the still-image icon is associated with the current display position coordinates of the still-image icon.

Subsequently, the switching icon determination section 156 determines whether the focus flag managed by the focus flag setting section 155 is "1" (S7).

If the focus flag is "1" (Yes in S7), the switching icon determination section 156 determines whether the display type switching position coordinates set by the position setting section 154 matches one of the display position coordinates of the currently-displayed icons, which are included in the positional information supplied from the scroll display processing section 153 (S8). In other words, the switching icon determination section 156 determines if there is a still-image icon which has reached the display type switching position coordinates.

If there are display position coordinates which match the display type switching position coordinates (Yes in S8), the switching icon determination section 156 specifies, in the positional information supplied from the scroll display processing section 153, the reference number corresponding to the matched display position coordinates. The switching icon determination section 156 then outputs, to the display type switching section 151, a switching instruction to which the specified switching icon determination section 156 is added (S9).

Figure 10:
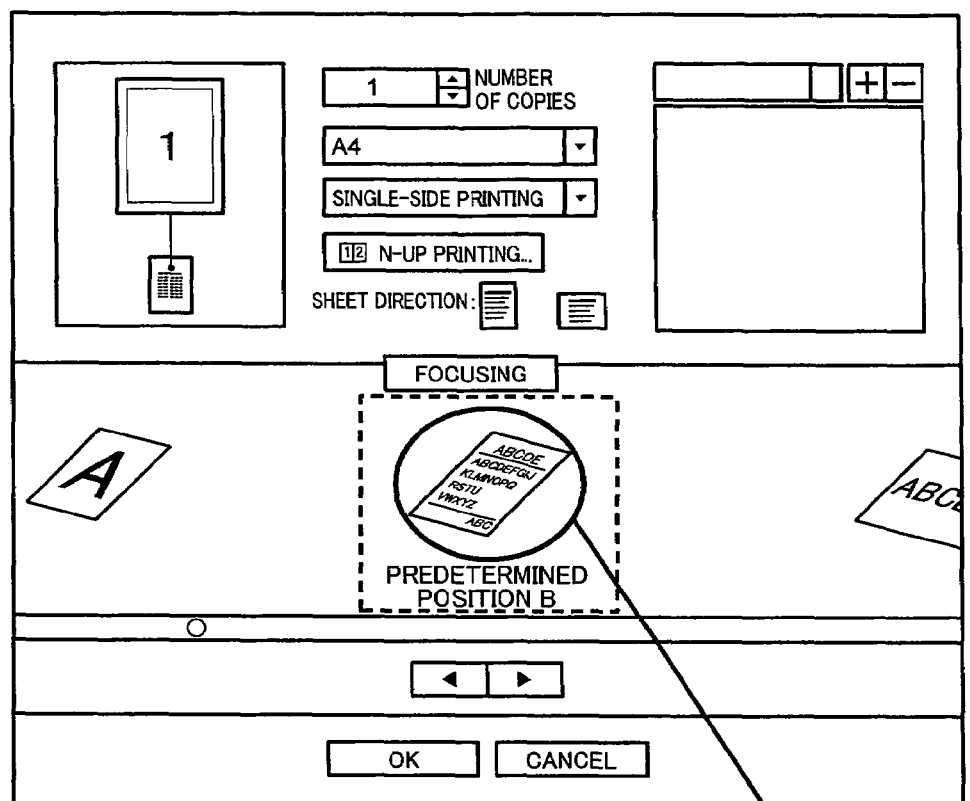
FIG. 10 shows an example of a setting screen in case where a still image icon having reached the display type switching position is changed to an animated icon.

Receiving the switching instruction, the display type switching section 151 reads out, from the content management section 13, an animated icon corresponding to the reference number added to the switching instruction. The display type switching section 151 then replaces the still-image icon, which corresponds to the reference number added to the switching instruction, with the animated icon having been read out from the content management section 13. As shown in FIG. 10, in accordance with the data of the animated icon with which the still-image icon is replaced, the scroll display processing section 153 changes, to the animated icon, the still-image icon having reached the display type switching position coordinates (coordinates of the predetermined position B in this case), and moves and plays back the animated icon (S10). The playback of the animated icon by the scroll display processing section 153 starts from a frame image with the frame number 1.

Subsequently, the scroll display processing section 153 determines if the last frame image of the animated icon has been played back (S11). If the last frame image has not been played back (No in S11), the scroll display processing section 153 plays back the next frame image, and then the step S11 is repeated.

If the last frame image of the animated icon has been played back (Yes in S11), the scroll display processing section 153 outputs, to the switching icon determination section 156, a one-cycle display completion notification to which the reference number of the aforesaid animated icon is added. Receiving the one-cycle playback completion notification from the scroll display processing section 153, the switching icon determination section 156 sends, to the display type switching section 151, a switching cancellation instruction including the reference number added to the one-cycle playback completion notification.

Thereafter, the display type switching section 151 reads out, from the content management section 13, a still-image icon corresponding to the reference number included in the switching cancellation instruction. The display type switching section 151 replaces the animated icon, which corresponds to the reference number included in the switching cancellation instruction, with the still-image icon having been read out from the content management section 13. In accordance with the data of the still-image icon with which the animated icon is replaced, the scroll display processing section 153 replaces the expanded function icon, which has been displayed for one cycle, with the still-image icon, and causes the still-image icon to continue the movement (S12).

Then the process goes to the step S13. The process also goes to the step S13 when, in S8, there are no display coordinates matching the display type switching position coordinates.

If the focus flag is "0" in S7, the process goes to S13 without performing the steps S8-S12.

Figure 11:
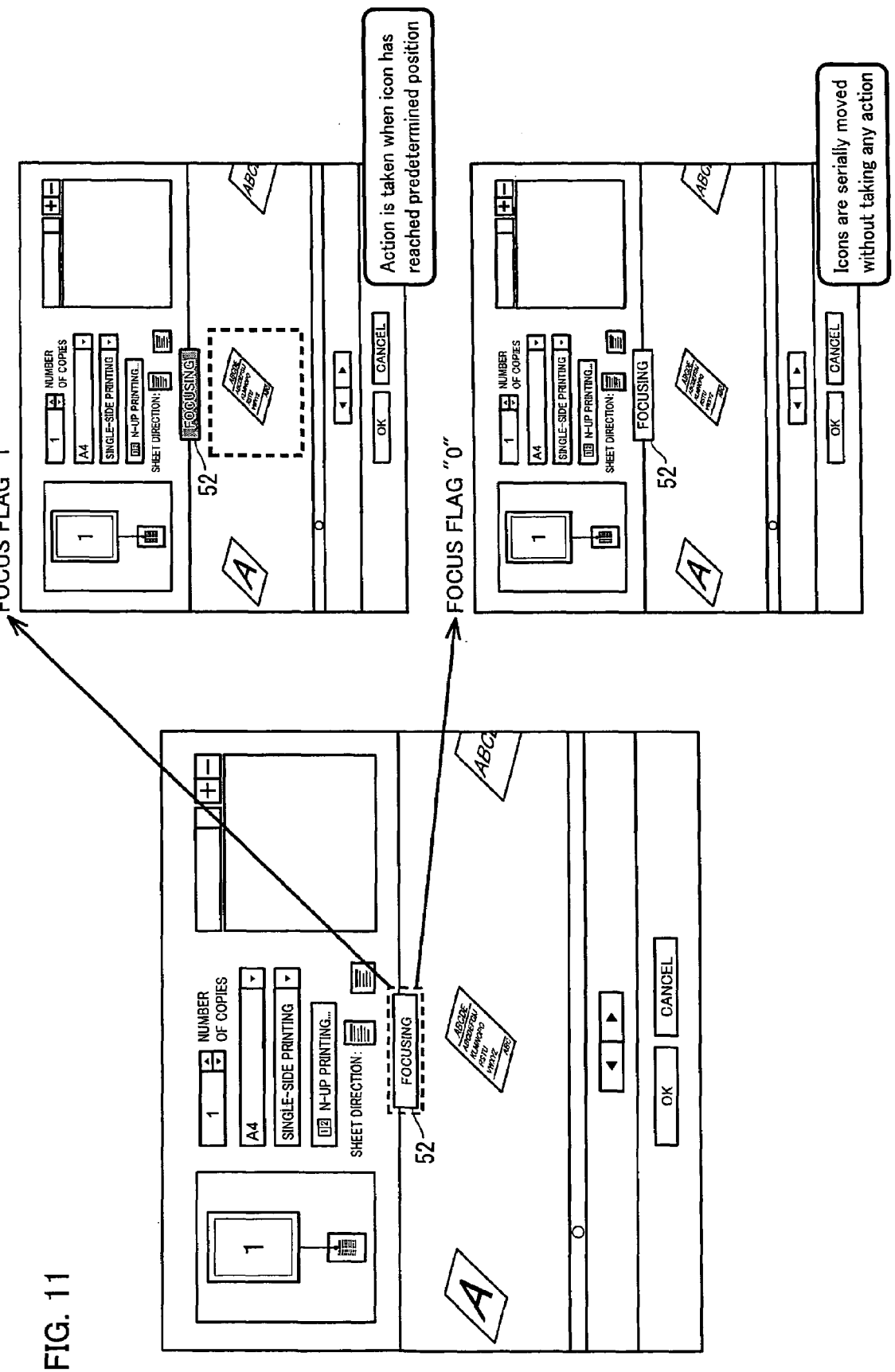
FIG. 11 shows the difference in a display process for displaying an expanded function icon, between a case where a focus flag is "1" and a case where the focus flag is "0".

That is, as shown in FIG. 11, if the focus flag is "1", the display type of the expanded function icon having reached the display type switching position (predetermined position B in this case) is switched (i.e. a still-image icon is switched to an animated icon in this case). On the other hand, if the focus flag is "0", the display type of the expanded function icon is not switched even if the icon has reached the display type switching position (predetermined position B in this case) (i.e. the type of the icon is still a still-image icon even after passing through the display type switching position).

Subsequently, the scroll display processing section 153 determines if the leading still-image icon I-n in the area B (i.e. the leftmost icon in the area B) has reached the edge (left edge in this case) of the area B (S13). If the icon I-n has reached the edge of the area B (Yes in S13), the scroll display processing section 153 stops, as shown in FIG. 12, displaying the expanded function icon I-n (I-1 in FIG. 12), and later repeatedly displays the icon I-n after all of the other expanded function icons are displayed (S14).

The focus flag setting section 155 then determines if a switching instruction to switch the focus flag has been input (S15). More specifically, the focus flag setting section 155 determines if a focus flag switching button 52 (see FIG. 6) in the setting screen 50 has been clicked.

If the focus flag switching button 52 has been clicked (Yes in S15), the focus flag setting section 155 switches the focus flag managed by itself (S16). That is, the focus flag "1", which is managed by the focus flag setting section 155, is changed to "0" or vice versa.

Thereafter, the expanded function icon display processing section 15 determines if a termination instruction has been supplied from the print job generation section 19 (S17). If the termination instruction has been supplied, the expanded function icon display processing section 15 terminates the process. On the other hand, if the termination instruction has not been supplied, the process goes back to the step S7.

(Setting of Printing Conditions)

Figure 13:
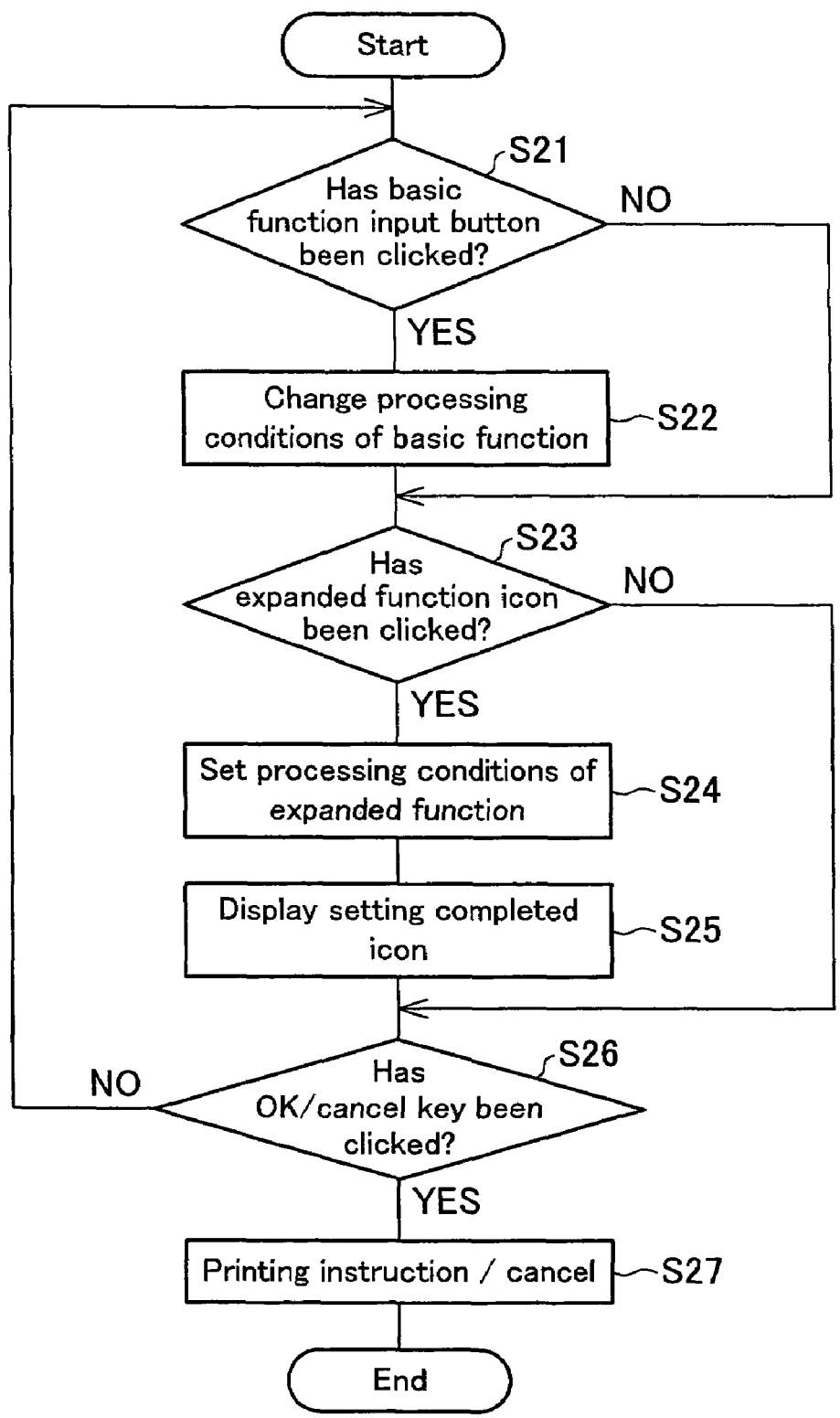
FIG. 13 is a flowchart showing the flow of a setting process of printing conditions.

Referring to the flowchart in FIG. 13, the following will describe the flow of a process of setting printing conditions and a printing instruction, in case where the setting screen is displayed as described above.

First, the basic function setting section 16a determines if input buttons (basic function input buttons 51a-51e, see FIG. 6) have been clicked (S21). Those input buttons are used for inputting processing conditions of basic functions and are displayed in the area A of the setting screen.

If at least one of those basic function input buttons 51a-51e has been clicked (Yes in S21), the basic function setting section 16a updates, in line with the user input, the processing conditions of the basic functions, which conditions are stored in the printing condition storage section 17 (S22). On the other hand, if none of the basic function input buttons 51a-51e has been clicked (No in S21), the process goes to the step S23.

Subsequently, in S23, the expanded function setting section 16b determines if an expanded function icon I (see FIG. 9) displayed in the area B of the setting screen has been clicked.

If the expanded function icon has been clicked (Yes in S23), the expanded function setting section 16b reads out, from the content management section 13, a dialogue box for inputting the processing conditions and a reference number, both of which correspond to the clicked expanded function icon, and displays the dialogue box on the display device 3. In response to the input to the dialogue box by the user, the expanded function setting section 16b sets the processing conditions of the expanded function. The expanded function setting section 16b then stores, in the printing condition storage section 17, the reference number of that expanded function and the processing conditions thus set, in association with one another (S24).

The setting completed icon display processing section 18 reads out a setting completed icon corresponding to the reference number stored in the printing condition storage section 17, and displays that icon in the area C of the setting screen (S25). This allows the user to easily recognize which expanded function has already been set. Thereafter, the process goes to the step S26. The process also goes to S26 when no expanded function icon has been clicked (No in S23).

Subsequently, the print job generation section 19 determines whether one of an OK button 54 (see FIG. 9) giving a printing instruction and a cancel button 53 (see FIG. 9) canceling the printing has been clicked (S26). Those buttons 53 and 54 are displayed on the setting screen.

If none of the OK button 54 and the cancel button 53 has been clicked (No in S26), the process goes back to the step S21.

On the other hand, if the OK button 54 or the cancel button 53 has been clicked (Yes in S26), the print job generation section 19 instructs/cancels the printing (S27), and then the process is terminated.

More specifically, in case where the OK button 54 has been clicked, the print job generation section 19 obtains image data to be printed from the application section 11, and reads out, from the printing condition storage section 17, processing conditions of each printing function thus set. Based on those processing conditions of each printing function, the print job generation section 19 converts the image data into print data, generates a processing instruction supplied to the printer 2, and outputs, to the printer 2, a print job which is constituted by the generated print data and processing instruction.

In case where the cancel button 53 has been clicked, the print job generation section 19 terminates the operation of the printer driver section 12.

In case when the OK button 54 or the cancel button 53 has been clicked, the print job generation section 19 sends a termination instruction to each block of the printer driver section 12.

(Variant Example of Display Type of Expanded Function Icon)

In the case above, when a switching instruction is supplied from the switching icon determination section 156 (i.e. when an expanded function icon reaches the display type switching position), the display type switching section 151 changes a still-image icon to an animated icon, as to the expanded function corresponding to the reference number added to the supplied switching instruction. However, the switching of the display type by the display type switching section 151 is not limited to the above. When an expanded function icon reaches the display type switching position, the scroll display processing section 153 may change the method of displaying the expanded function icon. The following will describe a variant example of a display process for displaying expanded function icons.

VARIANT EXAMPLE 1

In the variant example 1, the scroll display processing section 153 changes the travel speed of expanded function icons, when the display type switching section 151 switches a still-image icon to an animated icon.

In this variant example, the switching icon determination section 156 outputs the switching instruction and the switching cancellation instruction also to the scroll display processing section 153. After receiving the switching instruction and before receiving the switching cancellation instruction, the scroll display processing section 153 changes the travel speed of all expanded function icons.

Figure 14:
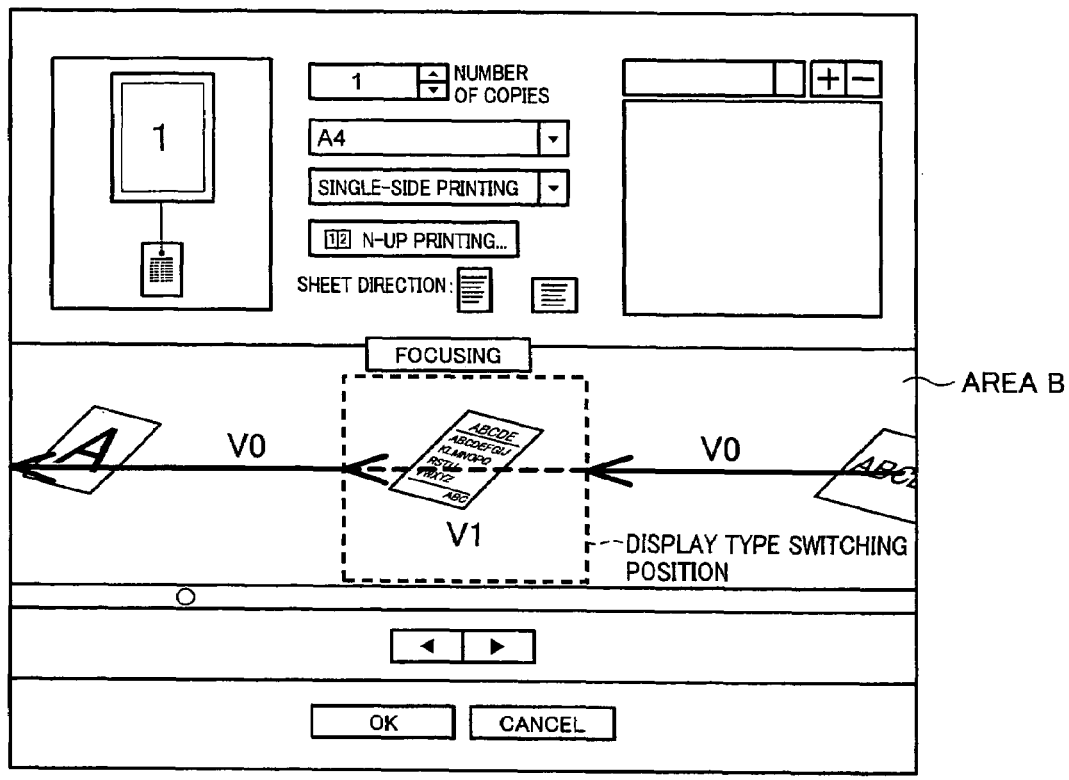
FIG. 14 shows an example of a setting screen in case where the expanded function icon is slowed down.
Figure 15:
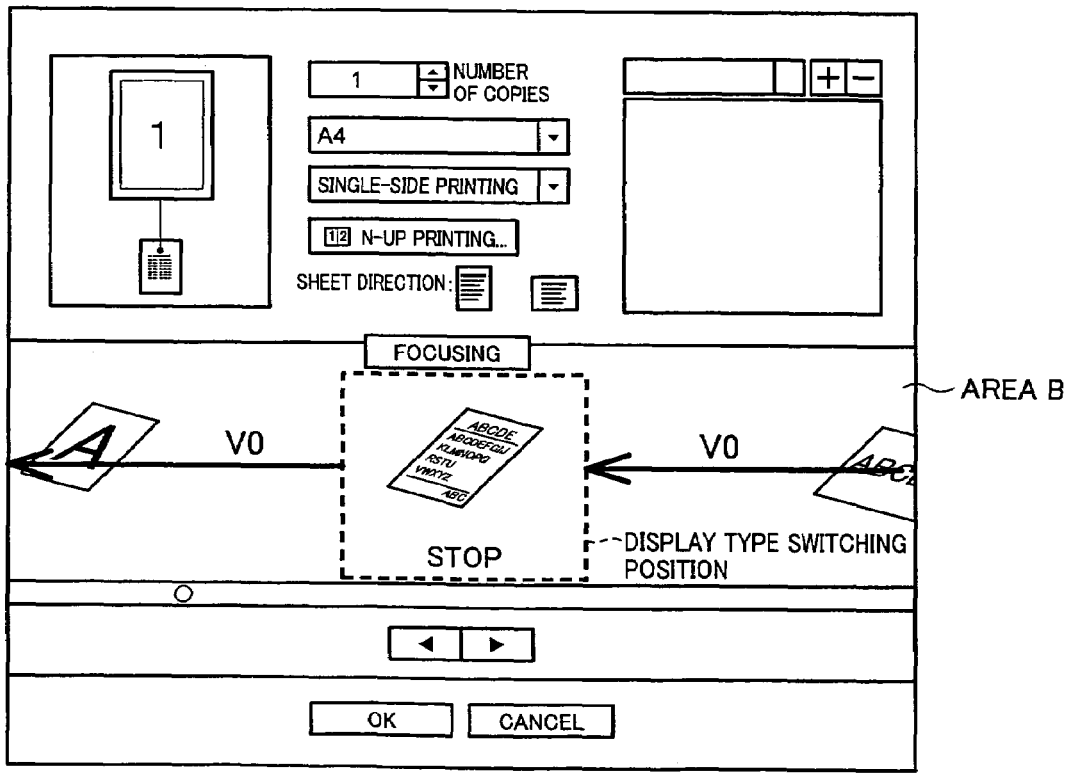
FIG. 15 shows an example of a setting screen in case where the expanded function icon is temporarily stopped.

For example, receiving the switching instruction, the scroll display processing section 153 changes, in the step S10, the travel speed of all expanded function icons from the aforesaid travel speed V0 to a predetermined travel speed V1 (V1<V0), as shown in FIG. 14. Thereafter, receiving the switching cancellation instruction, the scroll display processing section 153 returns the travel speed V1 to the travel speed V0, in the step S12.

As a result, the user can view animated icons with a slower travel speed. This allows the user to easily recognize the expanded functions indicated by those animated icons.

Receiving the switching instruction, the scroll display processing section 153 may change, in the step S10, the travel speed from V0 to 0. (In other words, the scroll display processing section 153 may stop the movement of all expanded function icons.) Receiving the switching cancellation instruction, the scroll display processing section 153 causes, in the step S12, the icons to move again at the travel speed V0.

This allows the user to view animated icons which do not move, and hence the user can easily recognize the expanded functions indicated by the animated icons.

VARIANT EXAMPLE 2

In this variant example, in regard of the display type of the expanded function icon corresponding to the reference number added to the switching instruction, the display type switching section 151 changes at least one of the brightness and color saturation of that expanded function icon to be different from that of other expanded function icons.

For example, the display type switching section 151 performs image processing so as to increase, in the step S10, the brightness of the expanded function icon corresponding to the reference number added to the switching instruction, and stores the data of the expanded function icon after the image processing in the display icon data storage section 152. As a result, only the expanded function icon having reached the display type switching position looks bright for the user, and hence that expanded function icon can be easily spotted by the user.

Alternatively, the display type switching section 151 performs image processing so as to decrease, in the step S10, the brightness of the expanded function icons other than the expanded function icon corresponding to the reference number added to the switching instruction, and stores the data of those expanded function icons after the image processing in the display icon data storage section 152. As a result, the expanded function icons other than the icon having reached the display type switching position are grayed out for the user, and hence the expanded function icon which is not grayed out (i.e. the expanded function icon having reached the display type switching position) is easily recognizable.

The display type switching section 151 performs image processing so as to change, in the step S10, the color of the expanded function icon corresponding to the reference number added to the switching function (for example, the color is changed from black to red), and the data of the expanded function icon after the image processing is stored in the displayed icon data storage section 152. As a result, for the user, the expanded function icon having reached the display type switching position has a color (e.g. red) different from the colors (e.g. black) of the other expanded function icons, and hence the expanded function icon with the different color is conspicuous.

The display type switching section 151 may not change a still-image icon to an animated icon. This is because, the display type switching section 151 can highlight the expanded function icon having reached the display type switching position, by causing the brightness or color saturation of the expanded function icon corresponding to the reference number added to the switching instruction (i.e. the expanded icon having reached the display type switching position) to be different from the brightness or color saturation of the other expanded function icons.

The display type switching section 151 may further highlight the animated icon by changing the still-image icon to the animated icon and also causing the brightness or color saturation of the animated icon to be different from that of the other expanded function icons (still-image icons in this case).

VARIANT EXAMPLE 3

In the present variant example, in regard of the display type of the expanded function icon corresponding to the reference number added to the switching instruction, the display type switching section 151 changes the brightness or color saturation of the background of the expanded function icon to be different from the brightness or color saturation of the background of the other expanded function icons.

Figure 16:
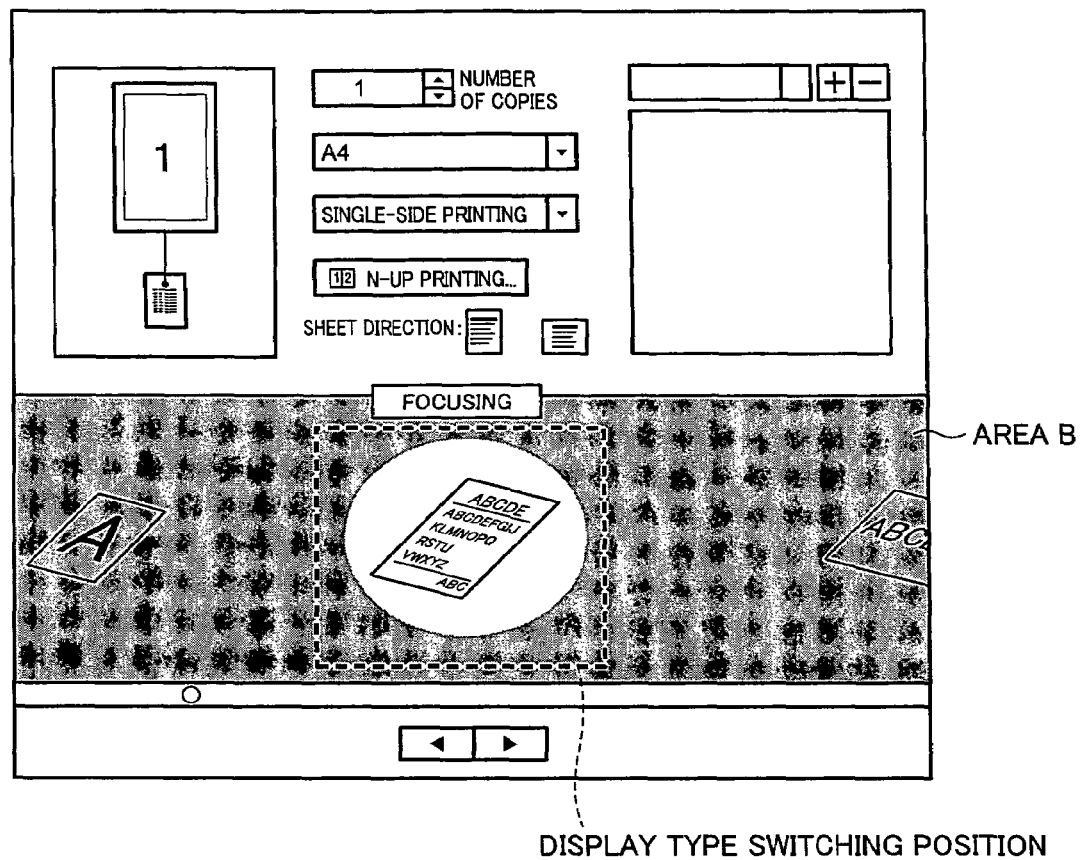
FIG. 16 shows an example of a setting screen in case where the brightness of the background of the expanded function icon is changed.
Figure 17:
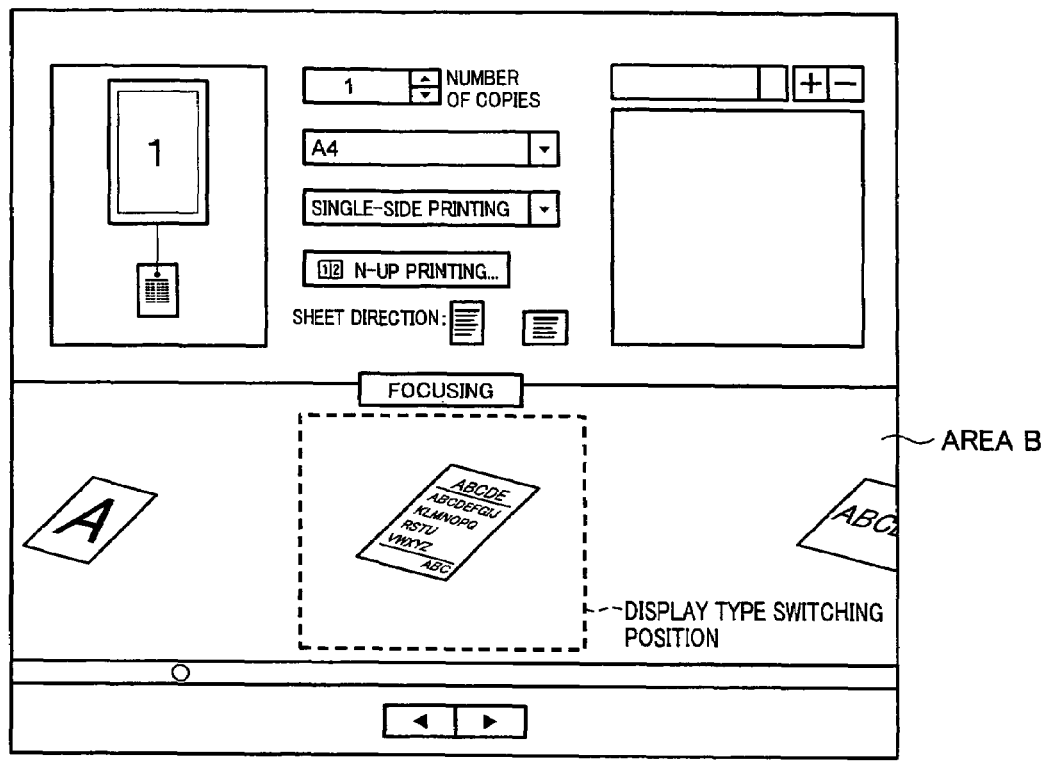
FIG. 17(a) shows an example of a setting screen in case where the expanded function icon is increased in size.
FIG. 17(b) shows an example of a setting screen in case where the expanded function icon is decreased in size.
Figure 17:
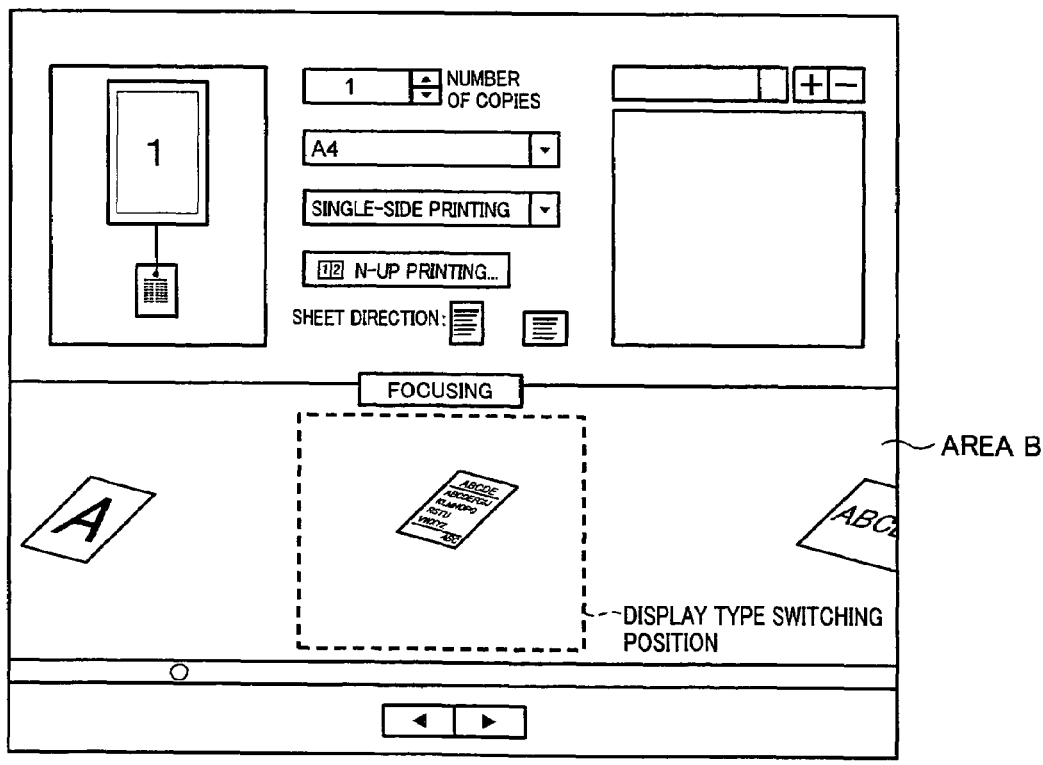

For example, in the step S10, the display type switching section 151 performs image processing so as to increase the brightness of the background of the expanded function icon corresponding to the reference number added to the switching instruction, and stores, in the displayed icon data storage section 152, the data of the expanded function icon after the image processing. As a result, as shown in FIG. 16, the expanded function icon having reached the display type switching position looks as if the spotlight is on the icon from behind. The expanded function icon is therefore conspicuous.

In FIG. 16, the variant example 2 is also adopted. On this account, the brightness of the expanded function icon corresponding to the reference number added to the switching instruction is differentiated from the brightness of the other expanded function icons.

Being similar to the variant example 2, the display type switching section 151 may change the brightness or color saturation of the background of the expanded function icon corresponding to the reference number added to the switching instruction to be different from the brightness or color saturation of the other expanded function icons, and change the expanded function icon corresponding to the reference number added to the switching instruction from a still-image icon to an animated icon. This causes the animated icon to be further conspicuous for the user.

VARIANT EXAMPLE 4

In this variant example, the display type switching section 151 changes the size of the expanded function icon corresponding to the reference number added to the switching instruction.

More specifically, in the step S10, the display type switching section 151 performs image processing so as to change the size (e.g. enlarging to 120% or downsizing to 80%) of the expanded function icon corresponding to the reference number added to the switching instruction, and stores, in the displayed icon data storage section 152, the data of the expanded function icon after the image processing. As a result, as shown in FIGS. 17(a) and 17(b), the size of the expanded function icon having reached the display type switching position is, for the user, different from the size of the other expanded function icons, and hence the expanded function icon with the different size is conspicuous. FIG. 17(a) shows a case where the expanded function icon having reached the display type switching position is enlarged in comparison with the other icons. On the other hand, FIG. 17(b) shows a case where the expanded function icon having reached the display type switching position is downsized as compared to the other icons.

Being similar to the variant example 2, the display type switching section 151 may change the size of the expanded function icon corresponding to the reference number added to the switching instruction to be different from the size of the other expanded function icons, and change the expanded function icon corresponding to the reference number added to the switching instruction from a still-image icon to an animated icon. This causes the animated icon to be further conspicuous for the user.

VARIANT EXAMPLE 5

In the examples above, only the expanded function corresponding to the reference number added to the switching instruction is changed from a still image icon to an animated icon by the display type switching section 151, and the animated icon is stored in the displayed icon data storage section 152. In the present example, the display type switching section 151 stores the animated icons of all reference numbers in the displayed icon data storage section 152, regardless of whether a switching instruction has been supplied.

Moreover, the switching icon determination section 156 outputs a switching instruction and a switching cancellation instruction also to the scroll display processing section 153.

Receiving a switching instruction, the scroll display processing section 153 plays back, from the frame number 1, the animated icon corresponding to the reference number added to the switching instruction. In addition, the scroll display processing section 153 sets the playback speed of the animated icon corresponding to the reference number added to the switching instruction at P1, while sets the playback speed of the other animated icons at P0 (P0>P1).

The playback speeds P0 and P1 are represented by the number of frames played back in a unit of time. The scroll display processing section 153 stores predetermined playback speeds P0 and P1.

Figure 18:
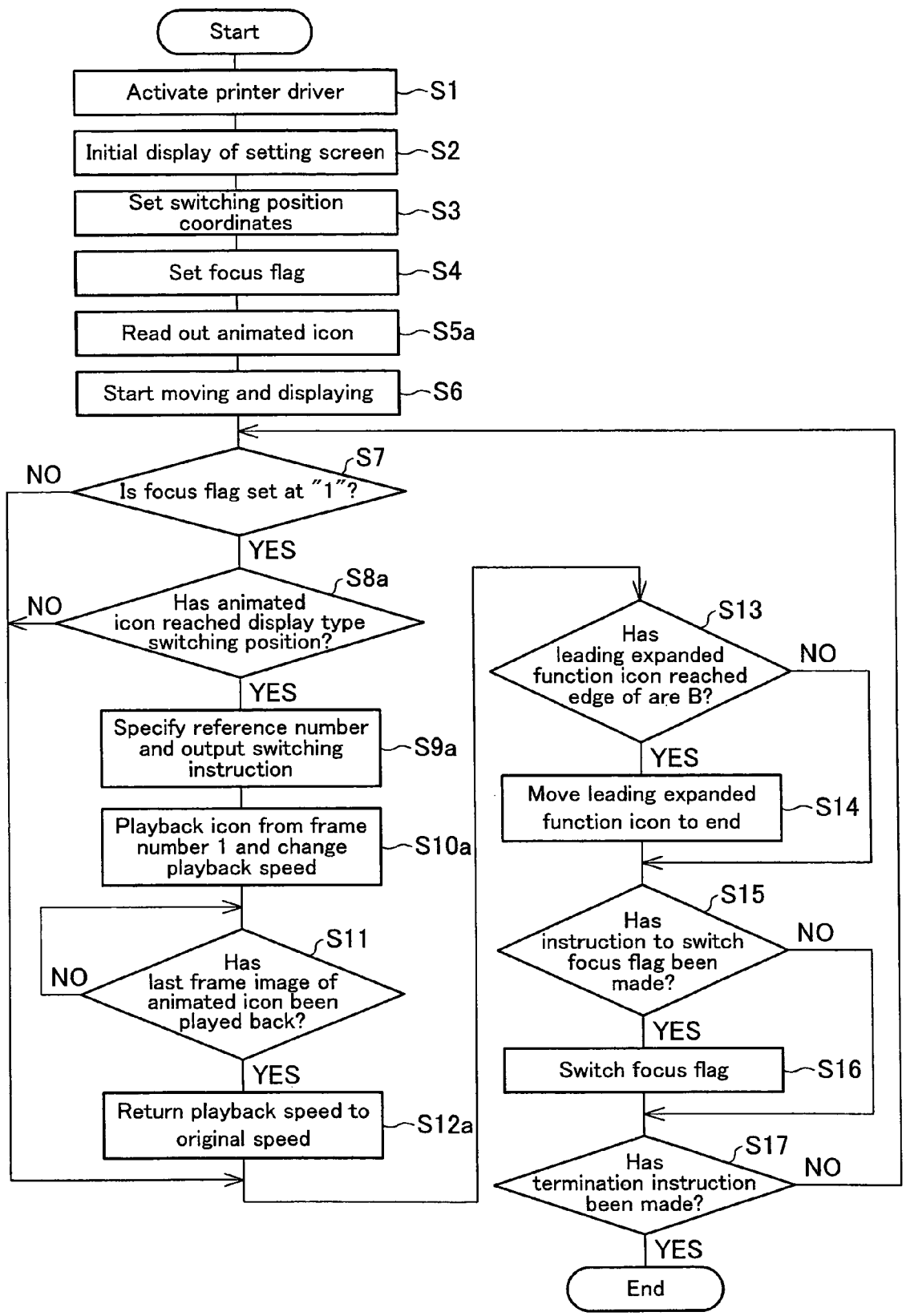
FIG. 18 is a flowchart showing the flow of a display process of an expanded function icon in a variant example 5.

The following will describe a display process for displaying expanded function icons in the present variant example, with reference to the flowchart in FIG. 18. The flowchart of the present example is identical with the flowchart in FIG. 8, except that S5a, S8a, S9a, S10a, and S12a are carried out instead of S5, S8, S9, S10, and S12. The following will discuss those differences.

In the variant example, in the step S5a, the display type switching section 151 reads out, from the content management section 13, animated icons corresponding to the respective reference numbers, and stores, in the displayed icon data storage section 152, the reference numbers and the animated icons in association with one another. In S6, the scroll display processing section 153 reads out the animated icons from the displayed icon data storage section 152, in line with the order of the reference numbers. The scroll display processing section 153 then causes the animated icons to be played back at a predetermined playback speed S0 and to move in the area B.

Furthermore, in S8a, the switching icon determination section 156 determines whether an animated icon has reached the display type switching position coordinates.

In S9a, the switching icon determination section 156 specifies, in the displayed icon data storage section 152, the reference number of the animated icon displayed at the display type switching position coordinates, and sends a switching instruction to which the specified reference number is added, to the scroll display processing section 153.

Figure 19:
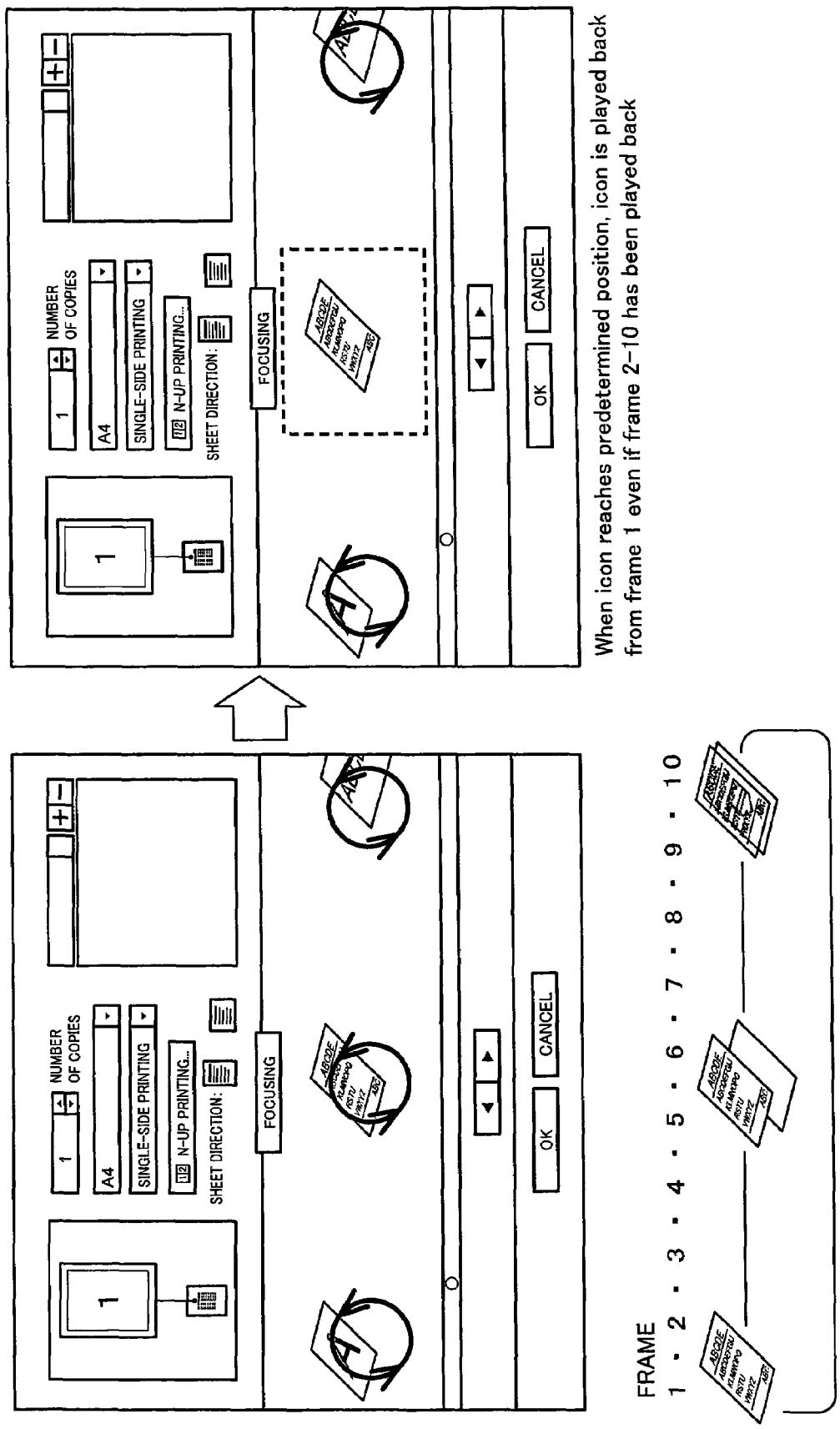
FIG. 19 shows an example where the frame number of an animated icon is changed.

In S10a, the scroll display processing section 153 plays back, from the frame number 1, the animated icon corresponding to the reference number added to the switching instruction. In other words, as shown in FIG. 19, while the frame numbers 1-10 of animated icons are being played back, the animated icon having reached the display type switching position coordinates is freshly played back from the frame number 1, regardless of the frame number being played back at the time.

Figure 20:
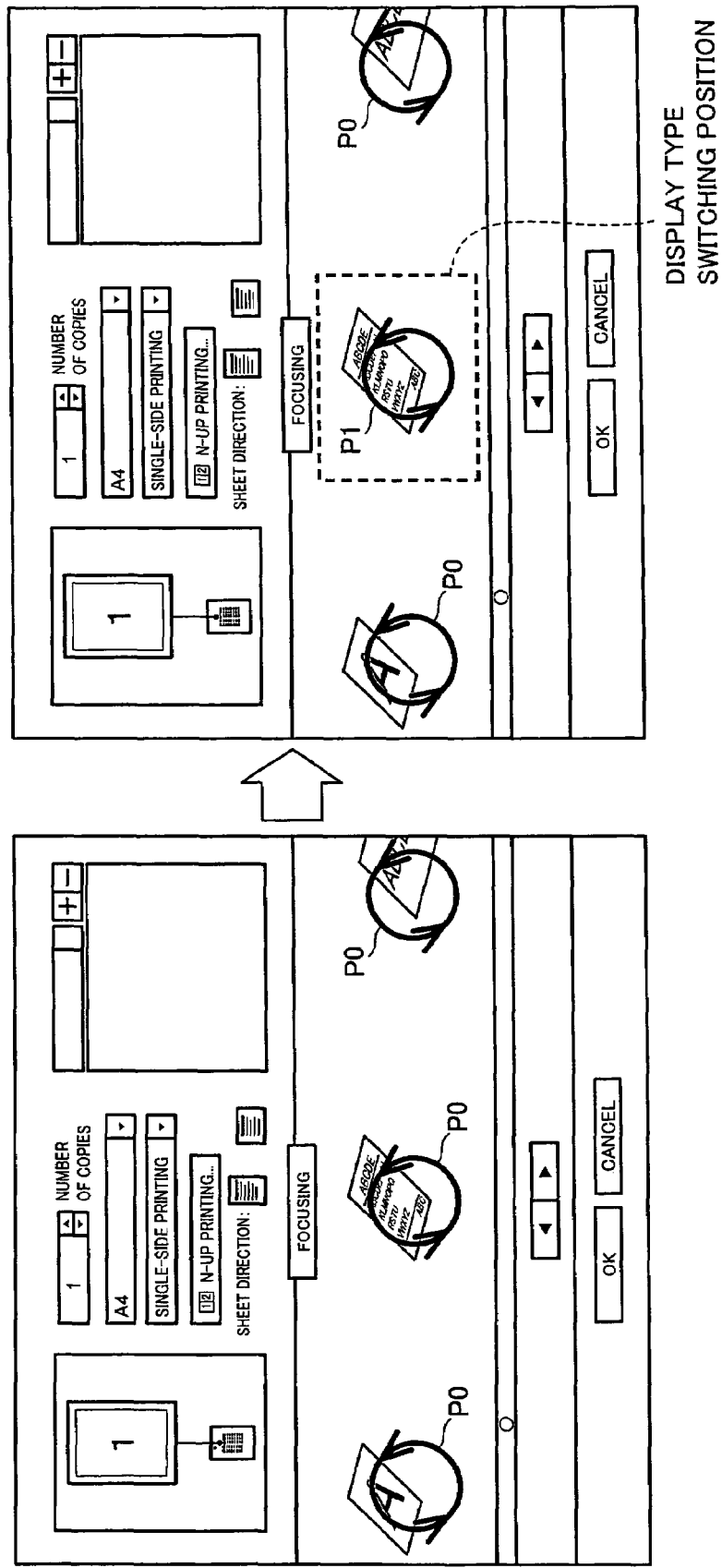
FIG. 20 shows an example of a setting screen in case where the playback speed of the animated icon is changed.

Furthermore, the scroll display processing section 153 sets the playback speed of only the animated icon corresponding to the reference number added to the switching instruction at P1. That is, as shown in FIG. 20, the playback speed of the animated icon is changed from P0 to P1 (P1<P0), when the icon reaches the display type switching position coordinates.

After the animated icon corresponding to the reference number added to the switching instruction is played back for one cycle (Yes in S11), the step S12a is carried out. That is, in S12a, the scroll display processing section 153 returns the playback speed of the animated icon, which corresponds to the reference number in the switching cancellation instruction, to P0.

In the present variant example, in regard of expanded functions corresponding to reference numbers not added to the switching instruction, the display type switching section 151 may change the animated icons, which are stored in the displayed icon data storage section 152, to still-image icons. On the other hand, in regard of the expanded function corresponding to the reference number included in the switching cancellation instruction, the display type switching section 151 may change the still-image icon, which is stored in the displayed icon data storage section 152, to an animated icon. With this, only the expanded function icon having reached the display type switching position coordinates is displayed as an animated icon, and hence this animated icon is conspicuous for the user.

In the present variant example, in regard of expanded functions corresponding to reference numbers not added to the switching instruction, the display type switching section 151 may gray out the expanded function icons stored in the displayed icon data storage section 152. As a result, expanded function icons other than the expanded function icon having reached the display type switching position coordinates are grayed out, and hence the expanded function icon having reached the display type switching position coordinates is highlighted for the user.

As described above, a host device (information processing device) 1 of the present embodiment is an information processing device which causes a display device 3 to display a setting screen by which processing conditions of a printer (setting target device) 2 and a print job generation section (setting target device) 19 are set. The host device 1 includes: a scroll display processing section 153 (scroll display processing means) which moves and plays back, in an area B of the setting screen, expanded function icons indicating which expanded functions are available when the printer 2 and the print job generation section 19 perform processes; a switching icon determination section (icon specifying means) 156 which specifies the reference number of the expanded function icon (specified icon) which has been moved to a display type switching position (specified position) in the area B, which position has been determined in advance or determined by the user input; and a display type switching section (display type switching means) 151 and a scroll display processing section (display type switching means) 153 by which the display type of the expanded function icon, which corresponds to the reference number specified by the switching icon determination section 156, is switched.

According to the arrangement above, the display type switching section 151 and the scroll display processing section 153 switch the display type of the expanded function icon which has reached the display type switching position in the area B.

The switching of the display type of an expanded function icon indicates that, for example, the display type switching section 151 switches a still-image icon to an animated icon, the scroll display processing section 153 freshly plays back the frames of an animated icon from the start, or the like.

As a result of the above, since the display type of the expanded function icon having reached the display type switching position is changed, the user pays attention to that expanded function icon. In this manner, it is possible to highlight a particular expanded function icon by changing its display type, among the expanded function icons displayed on the setting screen. The user does not have to check more than one expanded function icons, and hence the visibility is improved.

It is possible to cause the aforesaid icon to be further conspicuous, by changing the type of the icon from a still-image icon to an animated icon. Furthermore, since the animated icon indicates the content of the function, the user can easily recognize the function corresponding to the expanded function icon.

In addition to the above, if the animated icon is played back from the first frame, the user can see the action of the animated icon from the start. Since the animated icon indicates the content of the function, the user can easily recognize the function corresponding to the animated icon.

The display type switching section 151, furthermore, preferably switches the brightness, color saturation, or size of the expanded function icon having reached the display type switching position to be different from that of the other expanded function icons.

This makes it possible to further highlight the expanded function having reached the display type switching position.

The display type switching section 151, furthermore, preferably switches the brightness or color saturation of the background of the expanded function icon having reached the display type switching position to be different from the background of the other expanded function icons.

This makes it possible to further highlight the expanded function having reached the display type switching position.

The scroll display processing section 153, furthermore, preferably causes the playback speed of the frame images of the animated icon having reached the display type switching position to be slower than the playback speed of the other animated icons.

This allows the user to easily recognize the content of the function corresponding to the highlighted animated icon.

After the expanded function icon (animated icon in this case) reaches the display type switching position, the display type thereof is switched, and the frames thereof are played back for one cycle, the display type switching section 151 preferably returns the display type of the expanded function icon to the original type.

According to the arrangement above, the expanded function icon is highlighted for the user for a period of playing back, for one cycle, the expanded function icon having reached the display type switching position, i.e. a period required for causing the user to understand the content of the expanded function icon.

The scroll display processing section 153 slows down the travel speed of all expanded function icons or stops the movement of all expanded function icons, while the display type switching section 151 is changing the display type of the expanded function icon.

According to this arrangement, the movement of all of the expanded function icons is slowed down or stopped, while the display type is being switched. On this account, the visibility of the expanded function icon whose display type is switched is improved.

The host device 1 is preferably provided with a focus flag setting section (validation/invalidation switching means) 155 which validates/invalidates the display type switching means, in response to the user input.

Some users may be annoyed with the switching of the display type. According to the arrangement above, a user who does not need the switching of the display type can invalidate the focus flag setting section 155, whereas a user who needs the switching of the display type can validate the focus flag setting section 155. In this way, it is possible to meet the users' preferences.

Embodiment 2

According to Embodiment 1, in case where the focus flag is "1", any expanded function icon is changed in its display type, once the icon reaches the display type switching position coordinates. On the other hand, in the present embodiment, among the expanded function icons having reached the display type switching position coordinates, only an expanded function icon corresponding to an expanded function whose processing conditions have not been set is changed in its display type.

Figure 21:
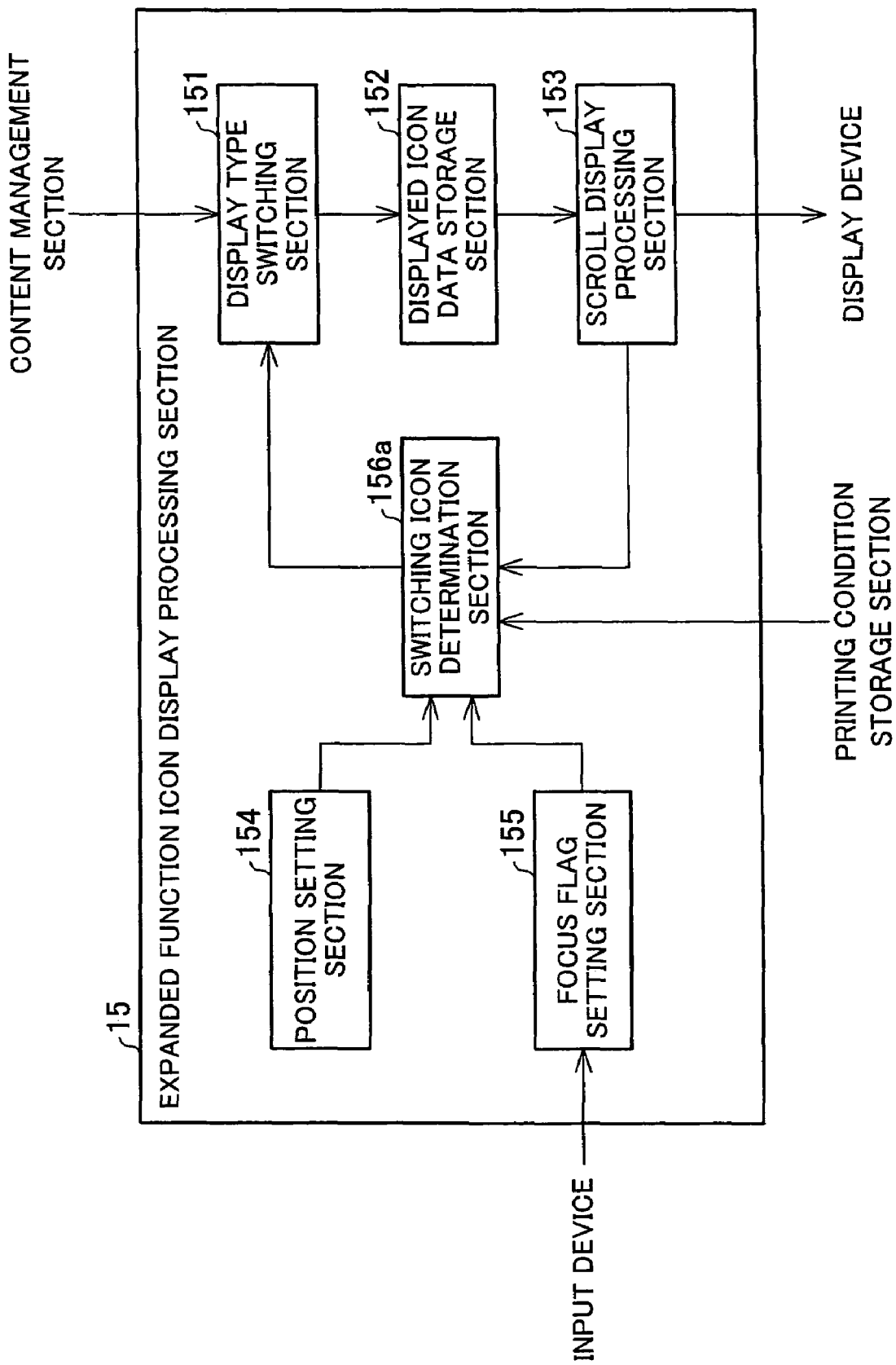
FIG. 21 is a block diagram showing an expanded function icon display processing section of Embodiment 2.

A host device 1 of the present embodiment is identical with the host device 1 shown in FIG. 2. In comparison with Embodiment 1, as shown in FIG. 21, the expanded function icon display processing section 15 of the present embodiment has a switching icon determination section (icon specifying means) 156a in place of the switching icon determination section 156.

Being similar to the switching icon determination section 156, the switching icon determination section 156a specifies, in the positional information, the reference number corresponding to the display position coordinates matching the display type switching position coordinates, in case where the focus flag managed by the focus flag setting section 155 is "1" (valid). Moreover, the switching icon determination section 156a determines whether the specified reference number is stored in the printing condition storage section 17. If the reference number is not stored, the switching icon determination section 156a supplies, to the display type switching section 151, a switching instruction which instructs to switch the display type and includes the specified reference number.

In addition to the above, receiving the one-cycle playback completion notification from the scroll display processing section 153, the switching icon determination section 156a supplies, to the scroll display processing section 153, a switching cancellation instruction including the reference number added to the one-cycle playback completion notification.

Figure 22:
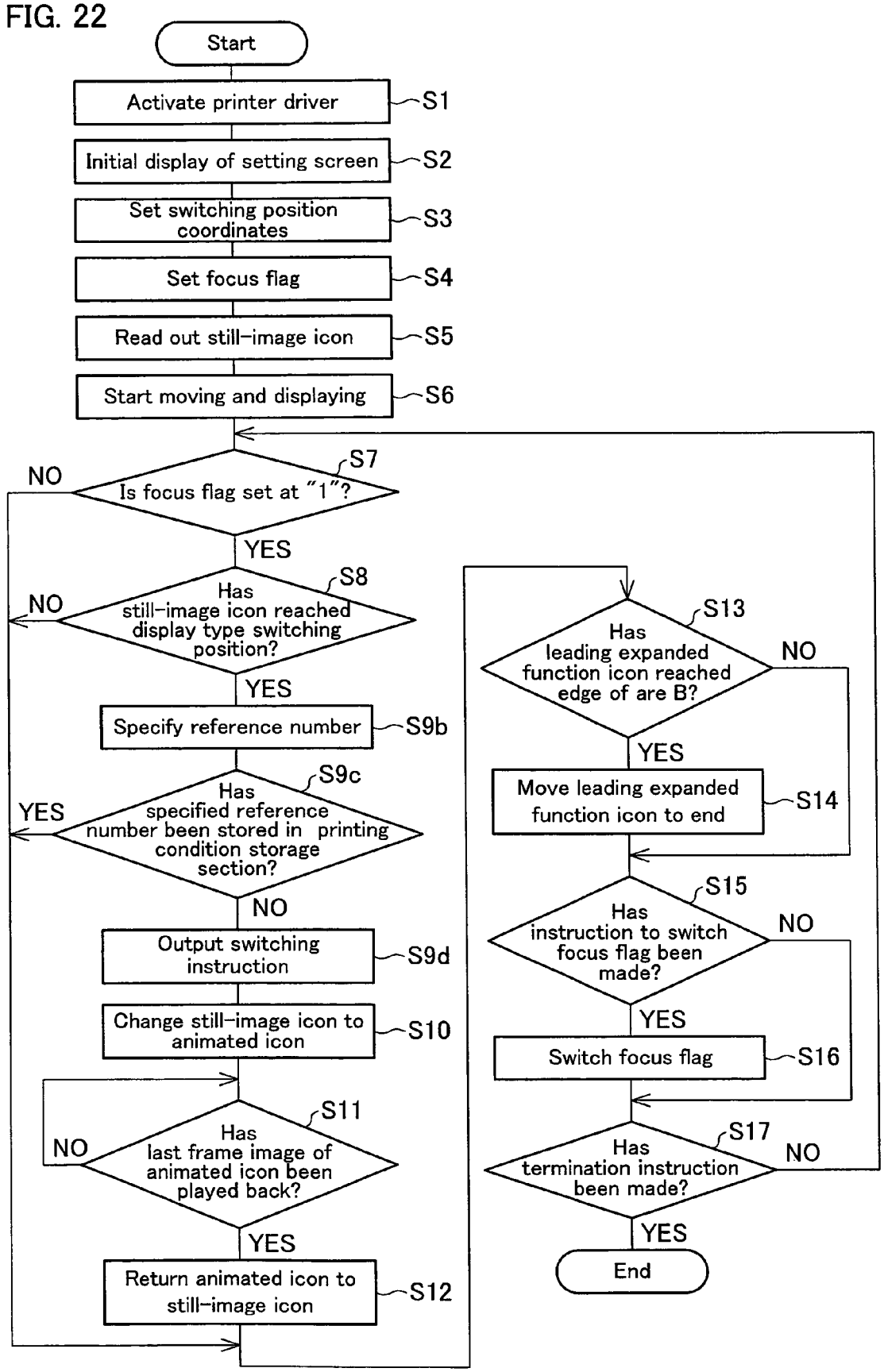
FIG. 22 shows a flowchart showing the flow of a display process of an expanded function icon of Embodiment 2.

FIG. 22 is a flowchart showing a display process for displaying expanded function icons in the present embodiment. As shown in FIG. 22, the display process of the expanded function icons in the present embodiment is identical with the process shown in FIG. 8, except that the steps S9b, S9c, and S9d are carried out in place of the step S9.

That is, the switching icon determination section 156a specifies, in the positional information supplied from the scroll display processing section 153, the reference number associated with the display position coordinates matching the display type switching position coordinates (S9b).

Thereafter, the switching icon determination section 156a determines if the specified reference number is stored in the printing condition storage section 17 (S9c). Reference numbers stored in the printing condition storage section 17 correspond to respective expanded functions whose processing conditions have been set by the expanded function setting section 16b. On the other hand, reference numbers not stored in the printing condition storage section 17 correspond to respective expanded functions whose processing conditions have not been set.

Only when the reference number specified in S9b is not stored in the printing condition storage section 17 (No in S9c), the switching icon determination section 156a outputs, to the display type switching section 151, a switching function to which the specified reference number is added (S9d).

On the contrary, if the reference number specified in S9b is stored in the printing condition storage section 17 (Yes in S9c), the process goes to the step S13.

In this manner, only the expanded function icon whose processing conditions have not been set is changed in its display type. As a result, the expanded function icon whose processing conditions have not been set is highlighted for the user.

As described above, the host device 1 of the present embodiment is provided with the expanded function setting section (function setting means) 16b which sets, in response to the user input, the processing conditions of the expanded function corresponding to the expanded function icon to which a setting instruction has been made. The switching icon determination section 156a specifies only a reference number corresponding to an expanded function icon which has not been set by the function setting means, among the expanded function icons having reached the specified position. The switching icon determination section 156a then outputs a switching instruction including the specified reference number.

According to the arrangement above, only an expanded function icon corresponding to an expanded function which has not been set is switched in its display type. The user therefore pays attention to the expanded function icon corresponding to the expanded function which has not been set, and hence the setting of the expanded function can be easily carried out.

Embodiment 3

In Embodiment 2, the display type of an expanded function icon is switched only as for an expanded function whose processing conditions have not been set. In the present embodiment, meanwhile, the display type of an expanded function icon is switched only as for an expanded function whose frequency in use is lower than a predetermined threshold.

Figure 23:
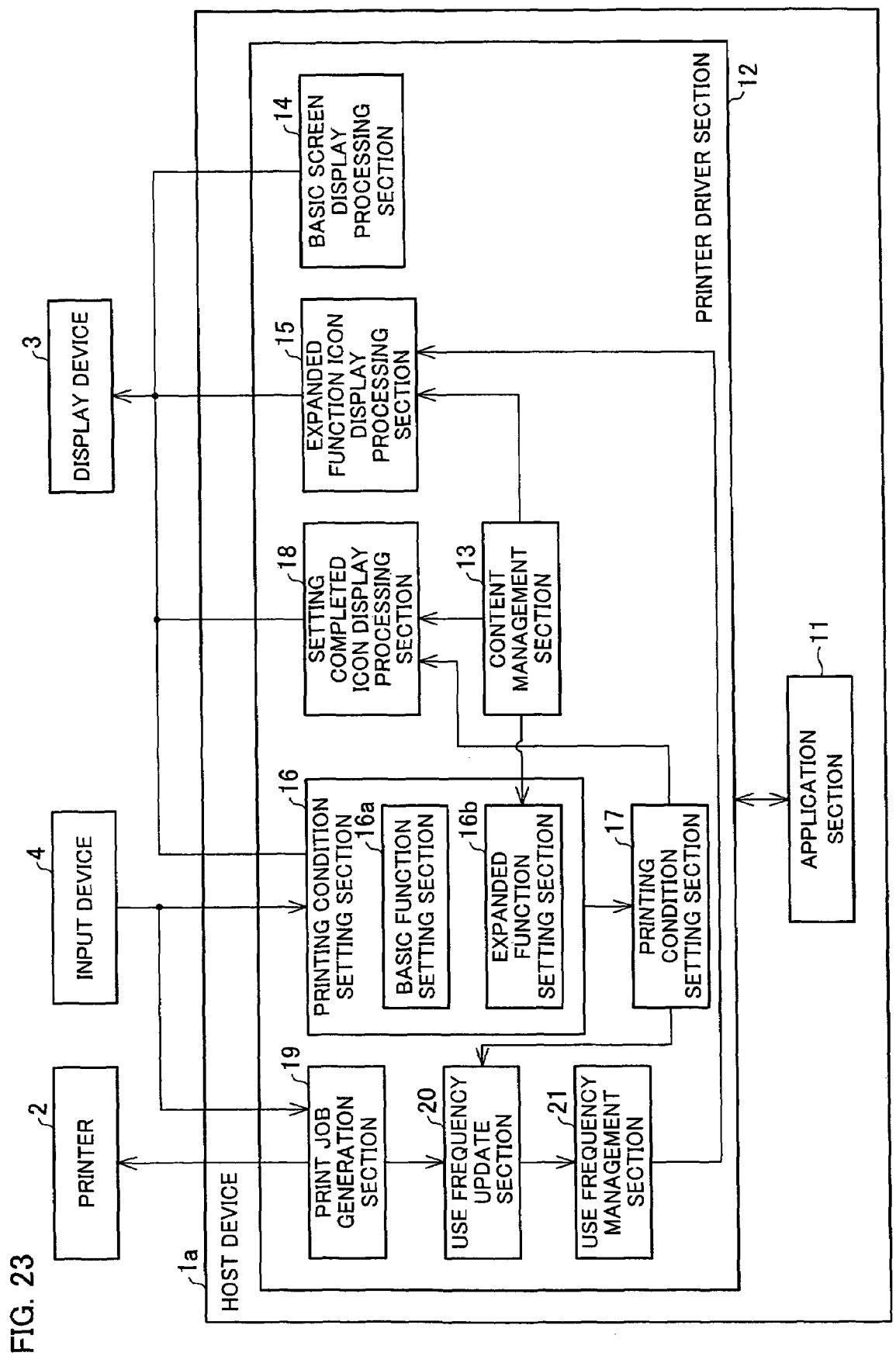
FIG. 23 shows a host device of Embodiment 3.

A host device 1a of the present embodiment is identical with the host device in Embodiment 1, except that a use frequency update section (calculating means) 20 and a use frequency management section 21 are additionally provided, as shown in FIG. 23.

The use frequency management section 21 manages a use frequency table which indicates the frequency in use of each expanded function. In the present embodiment, the use frequency management section 21 counts how many times each expanded function is used last week, as the use of frequency of each expanded function. It is, however, noted that the frequency of use is not necessarily measured in this way. FIG. 24 shows an example of the use frequency table managed by the user frequency management section 21.

The use frequency update section 20 updates the frequency of use managed by the use frequency management section 21. More specifically, when the print job generation section 19 generates a print job, the use frequency update section 20 reads out a reference number stored in the printing condition storage section 17, and stores history information in which the reference number is associated with the time (time of use) when the print job was generated. FIG. 25 shows an example of the history information.

Based on the history information, the use frequency update section 20 calculates the frequency of use in a predetermined period (e.g. one week) up until the present, for each reference number. The use frequency update section 20 then updates the use frequency table managed by the use frequency management section 21.

Figure 26:
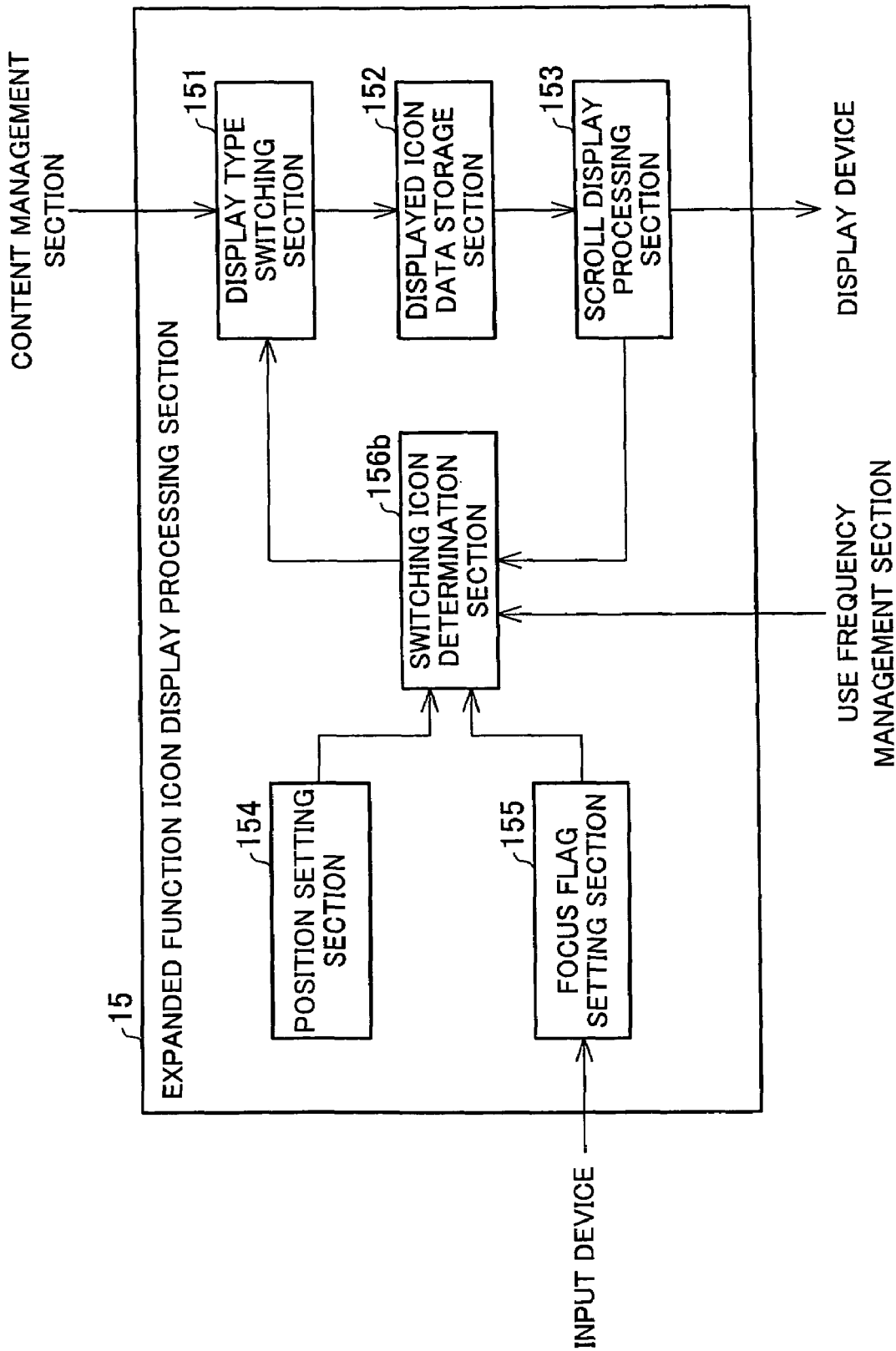
FIG. 26 shows a block diagram of an expanded function icon display processing section of Embodiment 3.

As shown in FIG. 26, the expanded function icon display processing section 15 of the present embodiment is identical with that of Embodiment 1, except that a switching icon determination section (icon specifying means) 156b is provided in place of the switching icon determination section 156.

Being similar to the foregoing switching icon determination section 156, the switching icon determination section 156b specifies, in the positional information, the reference number corresponding to the display position coordinates matching the display type switching position coordinates, in case where the focus flag managed by the focus flag setting section 155 is "1" (valid). The switching icon determination section 156b then reads out, from the use frequency table, the frequency of use corresponding to the specified reference number, and determines whether or not the frequency of use is not higher than a predetermined threshold (e.g. 5 times). Only when the frequency of use is not higher than the predetermined threshold, the switching icon determination section 156b sends, to the display type switching section 151, a switching instruction to which the reference number specified in the positional information is added.

Receiving the one-cycle playback completion notification from the scroll display processing section 153, the switching icon determination section 156b sends, to the scroll display processing section 153, a switching cancellation instruction including the reference number added to the one-cycle playback completion notification.

Figure 27:
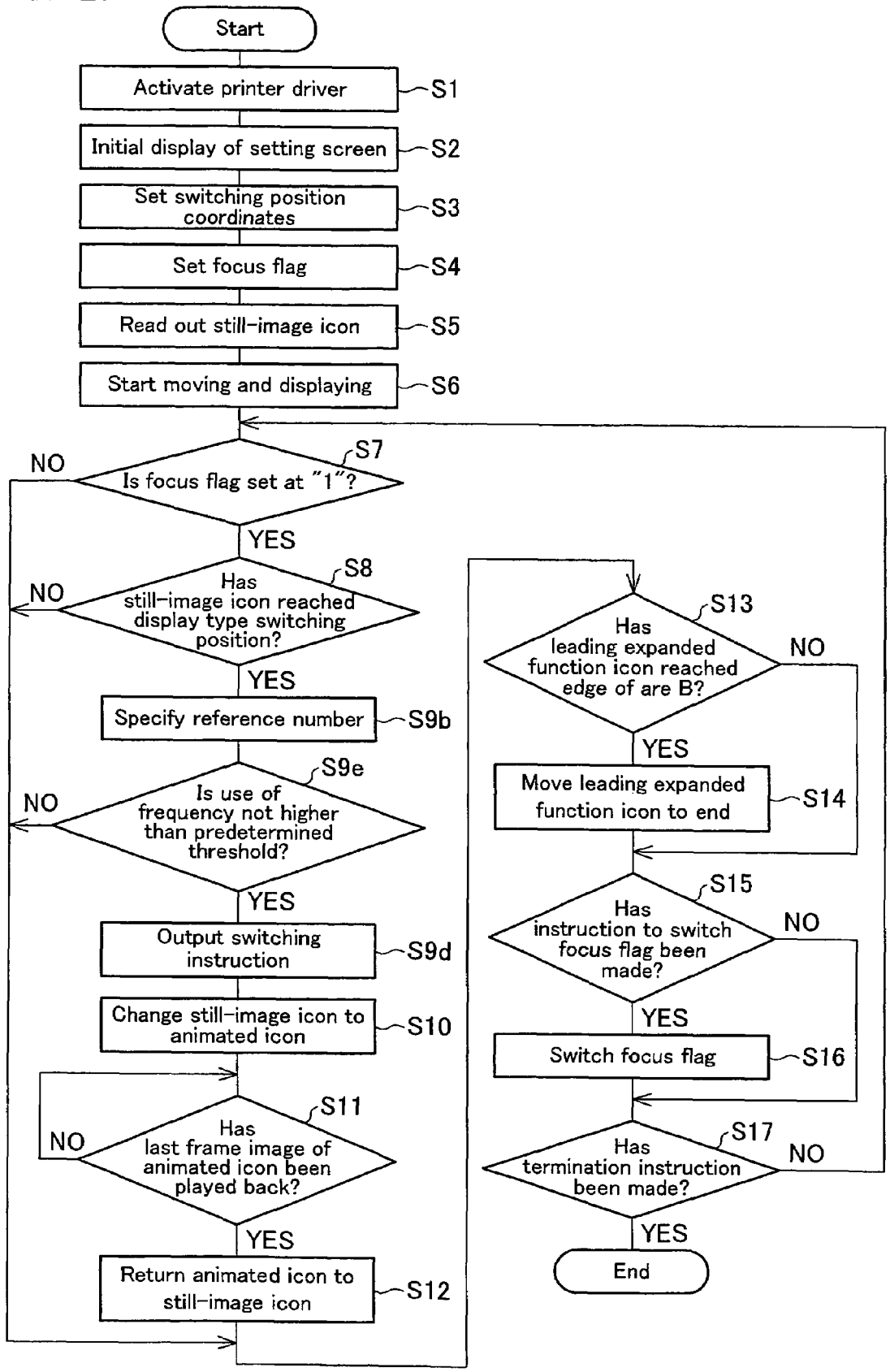
FIG. 27 is a flowchart showing the flow of a display process of an expanded function icon in Embodiment 3.

FIG. 27 is a flowchart of a display process for displaying expanded function icons in the present embodiment. As shown in this figure, the display process of the expanded function icons in the present embodiment is identical with the process shown in FIG. 22, except that the step S9e is carried out in place of the step S9c.

More specifically, the switching icon determination section 156b reads out, from the use frequency management section 21, the frequency of use corresponding to the specified reference number, and determines whether or not the frequency of use is not higher than a predetermined threshold (S9e).

If the frequency of use is not higher than the predetermined threshold (Yes in S9e), the switching icon determination section 156b outputs, to the display type switching section 151, a switching instruction to which the reference number specified in S9a is added (S9d).

On the other hand, if the frequency of use is higher than the predetermined threshold (No in S9e), the process goes to the step S13.

As discussed above, the host device 1a includes the use frequency update section (calculating means) 20 which calculates the frequency of use of each expanded function. The switching icon determination section 156b then outputs a switching instruction including the reference number of the expanded function icon corresponding to the expanded function whose frequency of use calculated by the use frequency update section 20 is not higher than a predetermined threshold, among the expanded function icons having reached the display type switching position.

In this way, only the expanded function icon corresponding to the expanded function whose frequency of use is not higher than the predetermined threshold is changed in its display type. As a result, the expand function icon which is not frequently used is highlighted for the user.

The blocks in the printer driver 12 may be realized by hardware logic. Alternatively, the blocks may be realized by software, with the use of a CPU as follows.

That is, the printer driver 12 may include members such as: a CPU that executes instructions of a control program realizing the functions; a ROM recording the program; a RAM on which the program is executed; and a storage device (recording medium) such as a memory, which stores the program and various kinds of data. The objective of the present invention can be achieved in the following manner: program code (e.g. an executable code program, intermediate code program, and source program) of the control program of the printer driver 12, the control program being software for realizing the functions, is recorded on a recording medium in a computer-readable manner, this recording medium is supplied to the printer driver 12, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card); and a semiconductor memory, such as a mask ROM, an EPROM (Erasable Programmable Read Only Memory), an EEPROM (Electrically Erasable Programmable Read Only Memory), or a flash ROM.

Alternatively, the printer driver 12 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

The present invention can be used for a printer driver by which a device for displaying a setting screen allowing a user to select a desired function among plural functions is constructed.

As described above, an information processing device of the present invention, which causes a display device to display a setting screen for setting a processing condition of a setting target device, the information processing device, includes: scroll display processing means for moving and serially displaying, in a predetermined area of the setting screen, respective icons indicating plural functions which are available when the setting target device executes a process; icon specifying means for specifying, as a specified icon, at least one of the icons having reached a predetermined position or a specified position which is specified by a user, in the predetermined area; and display type switching means for switching a display type of the specified icon specified by the icon specifying means.

According to this arrangement, the display type switching means switches the display type of the specified icon, when the icon has reached a predetermined position or a specified position which is specified by an input by the user.

The switching of the display type of the specified icon indicates, for example, that the specified icon is switched from a still image to an animated image, or the specified icon, which is an animated image, is played back from the first frame image.

Since the display type of the specified icon having reached the specified position is switched, the specified icon is highlighted for the user. As a result, the specified icon whose display type has been changed is conspicuous for the user, among the icons displayed on the setting screen. The user is not required to simultaneously check plural icons, and hence the visibility is improved.

By switching the display type of the specified icon from a still image to an animated image, the specified icon, which is switched to the animated image, is further highlighted for the user. Moreover, in case where an animated image indicates the content of a function, the user can easily recognize the function corresponding to the specified icon Furthermore, since the animated specified icon is played back from the first frame, the user can see the animation from the start. In case where the animated image indicates the content of a function, the use can easily recognize the function corresponding to the icon.

The information processing device of the present invention is preferably arranged such that the display type switching means further changes at least one of brightness, color saturation, and size of the specified icon specified by the icon specifying means to be different from that of the other icons.

According to this arrangement, at least one of the brightness, color saturation, and size of the specified icon having reached the specified position is different from that of the other icons. The specified icon having reached the specified position is highlighted for the user. Since the user further pays attention to the specified icon, it is unnecessary for the user to simultaneously check plural icons, and hence the visibility is improved.

The information processing device of the present invention is preferably arranged such that the display type switching means further changes at least one of brightness and color saturation of a background of the specified icon specified by the icon specifying means to be different from that of backgrounds of the other icons.

According to the arrangement above, at least one of the brightness, color saturation of the background of the specified icon having reached the specified position is different from that of the other icons. On this account, the specified icon having reached the specified position is highlighted for the user. Since the user further pays attention to the specified icon, it is unnecessary for the user to simultaneously check plural icons, and hence the visibility is improved.

The information processing device of the present invention is preferably arranged such that the display type switching means further causes a playback speed of frame images of the specified icon, which has been specified by the icon specifying means, to be slower than playback speeds of the other icons.

According to this arrangement, the specified icon having reached the specified position is slower than the other icons, in terms of the playback speed. This allows the user to easily recognize the content of the function corresponding to the specified icon to which the user pays attention.

The information processing device of the present invention is preferably arranged such that, after switching the display type of the specified icon and playing back the specified icon for one cycle, the display type switching means returns the display type of the specified icon to an original type.

According to this arrangement, the specified icon having reached the specified position is highlighted for the user for a period of playing back the specified icon for one cycle, i.e. for a period required for causing the user to understand what is indicated by the specified icon.

The information processing device of the present invention is preferably arranged such that the scroll display processing means slows travel speeds of all of the icons for a predetermined rate or stops all of the icons, while the display type switching means is switching the display type of the specified icon.

According to this arrangement, all of the icons are slowed down or stopped, while the display type is being switched. On this account, the visibility of the icon whose display type is being changed is improved.

The information processing device of the present invention preferably includes validation/invalidation means for switching validation/invalidation of a function of the display type switching means, in response to an input by the user.

Some users may be annoyed with the switching of the display type. According to the arrangement above, a user who does not need the switching of the display type can invalidate the validation/invalidation switching means, whereas a user who needs the switching of the display type can validate the validation/invalidation switching means. In this way, it is possible to meet the users' preferences.

The information processing device of the present invention preferably includes function setting means for setting, in response to an input by the user, a processing condition of a function corresponding to an icon to which a setting instruction has been made, the icon specifying means specifying, as the specified icon, only an icon which has not been set by the function setting means, among the icons having reached the specified position.

According to this arrangement, only a specified icon corresponding to a function which has not been set is changed in its display type. As a result, the user pays attention to the specified icon corresponding to a function which has not been set, and hence the setting operation can be easily carried out.

The information processing device of the present invention preferably includes calculating means for calculating frequency of use of each function, the icon specifying means specifying, as the specified icon, only an icon corresponding to a function whose frequency of use is not higher than a predetermined threshold, among the icons having reached the specified position In case where there are many functions, the user may not know the existence of some functions. According to the arrangement above, only a specified icon corresponding to a function which is not frequently used is changed in its display type. As a result, it is possible to let the user know functions which are not frequently used.

The information processing device of the present invention is preferably arranged such that the specified position is at one of a center and edges of the predetermined area.

At the center of the predetermined area, the icon is highlighted at the most conspicuous position for the user. At the edge of the predetermined area, an icon either is newly displayed in the area or stops the movement and will disappear from the area soon. When the specified position is at the edge of the area where an icon is newly displayed, an icon which is newly displayed in the predetermined area is highlighted for the user. When the specified position is at the edge of the area where an icon will disappear from the area soon, it is possible to prevent the user from forgetting to set the processing conditions.

The information processing device may be realized by a computer. In such a case, the scope of the present invention also encompasses a program which realizes the information processing device by a computer by causing the computer to function as the aforesaid means, and a computer-readable storage medium storing the program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information processing device which causes a display device to display a setting screen for setting a processing condition of a setting target device, the information processing device comprising:

scroll display processing means for automatically moving and serially displaying, in a predetermined area of the setting screen, respective icons indicating plural functions which are available when the setting target device executes a process;

icon specifying means for specifying, as a specified icon, at least one of the icons automatically having reached a predetermined position or a specified position which is specified by a user, in the predetermined area;

display type switching means for switching a display type of the specified icon specified by the icon specifying means, and function setting means for setting, in response to an input by the user, a processing condition of a function corresponding to an icon to which a setting instruction has been made, wherein, the display type switching means switches the display type of the specified icon from a still image to an animated image, and the icon specifying means specifies, as the specified icon, only an icon which has not been set by the function setting means, among the icons having reached the specified position.

2. The information processing device as defined in claim 1, wherein, the icons are animated images, and the display type switching means switches the display type of the specified icon so that the specified icon is played back from a first frame image.

3. The information processing device as defined in claim 1, wherein, the display type switching means further changes at least one of brightness, color saturation, and size of the specified icon specified by the icon specifying means to be different from that of the other icons.

4. The information processing device as defined in claim 1, wherein, the display type switching means further changes at least one of brightness and color saturation of a background of the specified icon specified by the icon specifying means to be different from that of backgrounds of the other icons.

5. The information processing device as defined in claim 2, wherein, the display type switching means further causes a playback speed of frame images of the specified icon, which has been specified by the icon specifying means, to be slower than playback speeds of the other icons.

6. The information processing device as defined in claim 1, wherein, after switching the display type of the specified icon and playing back the specified icon for one cycle, the display type switching means returns the display type of the specified icon to an original type.

7. The information processing device as defined in claim 5, wherein, after switching the display type of the specified icon and playing back the specified icon for one cycle, the display type switching means returns the display type of the specified icon to an original type.

8. The information processing device as defined in claim 1, wherein, the scroll display processing means slows travel speeds of all of the icons to a predetermined rate or stops all of the icons, while the display type switching means is switching the display type of the specified icon.

9. The information processing device as defined in claim 1, further comprising validation/invalidation means for switching validation/invalidation of a function of the display type switching means, in response to an input by the user.

10. The information processing device as defined in claim 1, wherein, the specified position is at one of a center and edges of the predetermined area.

11. A method of displaying icons in an information processing device, and of causing a display device to display a setting screen by which a processing condition of a setting target device is set, the method comprising the steps of:

automatically moving and serially displaying, in a predetermined area of the setting screen, icons indicating plural functions which are available when the setting target device executes a process;

specifying, as a specified icon, at least one of the icons which automatically has reached a predetermined position or a specified position specified by a user, in the predetermined area;

switching a display type of the specified icon; and setting, in response to an input by the user, a processing condition of a function corresponding to an icon to which a setting instruction has been made, wherein, the switching switches the display type of the specified icon from a still image to an animated image, and the specifying specifies, as the specified icon, only an icon which has not been set by the function setting means, among the icons having reached the specified position.

12. A computer-readable storage medium storing a program for operating an information processing device which causes a display device to display a setting screen for setting a processing condition of a setting target device, the information processing device including:

scroll display processing means for automatically moving and serially displaying, in a predetermined area of the setting screen, respective icons indicating plural functions which are available when the setting target device executes a process;

icon specifying means for specifying, as a specified icon, at least one of the icons automatically having reached a predetermined position or a specified position which is specified by a user, in the predetermined area;

display type switching means for switching a display type of the specified icon specified by the icon specifying means, and function setting means for setting, in response to an input by the user, a processing condition of a function corresponding to an icon to which a setting instruction has been made, wherein, the display type switching means switches the display type of the specified icon from a still image to an animated image, and the icon specifying means specifies, as the specified icon, only an icon which has not been set by the function setting means, among the icons having reached the specified position, and the program causes a computer to function as the scroll display processing means, the icon specifying means, the display switching means and the function setting means.

13. An information processing device which causes a display device to display a setting screen for setting a processing condition of a setting target device, the information processing device comprising:

scroll display processing means for automatically moving and serially displaying, in a predetermined area of the setting screen, respective icons indicating plural functions which are available when the setting target device executes a process;

icon specifying means for specifying, as a specified icon, at least one of the icons automatically having reached a predetermined position or a specified position which is specified by a user, in the predetermined area;

display type switching means for switching a display type of the specified icon specified by the icon specifying means, and calculating means for calculating frequency of use of each function, wherein, the display type switching means switches the display type of the specified icon from a still image to an animated image, and the icon specifying means specifies, as the specified icon, only an icon corresponding to a function whose frequency of use as calculated by said calculating means is not higher than a predetermined threshold, among the icons having reached the specified position.

\* \* \* \* \*